United States Patent
Saiga et al.

(10) Patent No.: US 8,107,743 B2
(45) Date of Patent: Jan. 31, 2012

(54) IMAGE PROCESSING DEVICE, IMAGE PROCESSING METHOD, AND STORAGE MEDIUM

(75) Inventors: Hisashi Saiga, Nara (JP); Yoichiro Yahata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 979 days.

(21) Appl. No.: 12/057,210

(22) Filed: Mar. 27, 2008

(65) Prior Publication Data

US 2008/0240584 A1  Oct. 2, 2008

(30) Foreign Application Priority Data

Mar. 30, 2007  (JP) ................................ 2007-094987
Feb. 14, 2008  (JP) ................................ 2008-033685

(51) Int. Cl.
  *G06K 9/34* (2006.01)
  *G06K 9/36* (2006.01)
  *G06K 9/46* (2006.01)
(52) U.S. Cl. ...................... 382/232; 382/173; 382/176
(58) Field of Classification Search .................. None
See application file for complete search history.

(56) References Cited

U.S. PATENT DOCUMENTS

| | | | |
|---|---|---|---|
| 5,615,281 A | 3/1997 | Yamaguchi | |
| 5,872,864 A * | 2/1999 | Imade et al. | 382/176 |
| 5,966,455 A * | 10/1999 | Saito | 382/112 |
| 6,381,368 B1 * | 4/2002 | Kanatsu | 382/233 |
| 6,404,919 B1 * | 6/2002 | Nishigaki et al. | 382/176 |
| 7,027,184 B2 * | 4/2006 | Matsui | 358/1.9 |
| 7,653,254 B2 * | 1/2010 | Ito et al. | 382/239 |
| 2002/0031281 A1 * | 3/2002 | Chiba et al. | 382/305 |
| 2002/0051230 A1 | 5/2002 | Ohta | |
| 2004/0061883 A1 * | 4/2004 | Kanatsu | 358/1.9 |
| 2004/0125404 A1 | 7/2004 | Isshiki | |
| 2006/0132857 A1 | 6/2006 | Akashi | |
| 2006/0133679 A1 * | 6/2006 | Yoshida | 382/239 |
| 2008/0080780 A1 | 4/2008 | Isshiki | |

FOREIGN PATENT DOCUMENTS

| | | |
|---|---|---|
| JP | 4134570 A2 | 5/1992 |
| JP | 2001211316 A2 | 8/2001 |
| JP | 2004-214738 A | 7/2004 |
| JP | 2006-174239 A | 6/2006 |

OTHER PUBLICATIONS

"New Edition: Image Analysis Handbook", Tokyo University Press, published on Sep. 10, 2004, pp. 1350-1373.

* cited by examiner

*Primary Examiner* — Samir Ahmed
*Assistant Examiner* — Li Liu
(74) *Attorney, Agent, or Firm* — Birch, Stewart, Kolasch & Birch, LLP

(57) ABSTRACT

The image processing device of the present invention includes: an image acquiring section (2) acquiring image data; an image data generating section (32) generating attribute data including each attribute value indicative of an attribute to which each of a plurality of pixels constituting an image indicated by the image data acquired by the image acquiring section (2) belongs among predetermined attributes; and image data reducing section (34) reducing the attribute data by converting, to one attribute value, at least two attribute values included in the attribute data generated by the attribute data generating section, according to a priority given to the each attribute value. Therefore, it becomes possible to realize an image processing device that can reduce the attribute data while keeping important information included in the attribute data, and further improve encoding efficiency of the attribute data.

6 Claims, 32 Drawing Sheets

| PIXEL VALUE | PRIORITY |
|---|---|
| 0 | 0 |
| 1 | 0 |
| 2 | 0 |
| 3 | 1 |
| 4 | 2 |
| 5 | 1 |
| 6 | 0 |
| 7 | 3 |

FIG. 8

| PIXEL VALUE | CONVERTED VALUE |
|---|---|
| 0 | 0 |
| 1 | 7 |
| 2 | 2 |
| 3 | 3 |
| 4 | 4 |
| 5 | 5 |
| 6 | 6 |
| 7 | 1 |

FIG. 9

| PIXEL VALUE | CONVERTED VALUE | PIXEL VALUE IN BINARY SYSTEM | | | CONVERTED VALUE IN BINARY SYSTEM | | | ATTRIBUTE |
|---|---|---|---|---|---|---|---|---|
| 0 | 0 | 0 | 0 | 0 | 0 | 0 | 0 | BACKGROUND (WHITE) |
| 1 | 7 | 0 | 0 | 1 | 1 | 1 | 1 | N/A |
| 2 | 2 | 0 | 1 | 0 | 0 | 1 | 0 | N/A |
| 3 | 3 | 0 | 1 | 1 | 0 | 1 | 1 | HALFTONE DOT |
| 4 | 4 | 1 | 0 | 0 | 1 | 0 | 0 | COLOR CHARACTER/LINE WORK |
| 5 | 5 | 1 | 0 | 1 | 1 | 0 | 1 | PHOTOGRAPH |
| 6 | 6 | 1 | 1 | 0 | 1 | 1 | 0 | N/A |
| 7 | 1 | 1 | 1 | 1 | 0 | 0 | 1 | BLACK CHARACTER/LINE WORK |

FIG. 18

| PIXEL VALUE | CONVERTED VALUE |
|---|---|
| 0 | 0 |
| 1 | 7 |
| 2 | 2 |
| 3 | 3 |
| 4 | 4 |
| 5 | 5 |
| 6 | 6 |
| 7 | 1 |

FIG. 25 (a)

| PIXEL | APPEARANCE FREQUENCY |
|---|---|
| 0 | 12000 |
| 1 | 0 |
| 2 | 0 |
| 3 | 2300 |
| 4 | 2000 |
| 5 | 0 |
| 6 | 0 |
| 7 | 84 |

FIG. 25 (b)

| APPEARANCE FREQUENCY ORDER | PIXEL |
|---|---|
| 0 | 0 |
| 1 | 3 |
| 2 | 4 |
| 3 | 7 |
| 4 | 1 |
| 5 | 2 |
| 6 | 5 |
| 7 | 6 |

FIG. 26

| ORDER | PIXEL | PIXEL VALUE IN BINARY SYSTEM | | |
|---|---|---|---|---|
| 0 | 0 | 0 | 0 | 0 |
| 1 | 1 | 0 | 0 | 1 |
| 2 | 2 | 0 | 1 | 0 |
| 3 | 3 | 0 | 1 | 1 |
| 4 | 4 | 1 | 0 | 0 |
| 5 | 5 | 1 | 0 | 1 |
| 6 | 6 | 1 | 1 | 0 |
| 7 | 7 | 1 | 1 | 1 |

FIG. 28

COMMUNITY ASSOCIATION NEWS No. 9

2006 ACTIVITY PLAN COMES UP!
AS DESTINATION OF
OVERSEAS HIKING, UK ---102

VARIOUS SPORTS EVENTS
NEW!: "BICYCLE"

SHOP AT ○○

| PIXEL | PIXEL VALUE IN BINARY SYSTEM | | PIXEL VALUE ON FIRST PLANE | PIXEL VALUE ON SECOND PLANE | PIXEL VALUE ON THIRD PLANE | ATTRIBUTE |
|---|---|---|---|---|---|---|
| 0 | 0 | 0 | 0 | 0 | 0 | BACKGROUND (WHITE) |
| 1 | 0 | 0 | 1 | 0 | 0 | N/A |
| 2 | 0 | 1 | 0 | 0 | 1 | N/A |
| 3 | 0 | 1 | 1 | 0 | 1 | HALFTONE DOT |
| 4 | 1 | 0 | 0 | 1 | 0 | COLOR CHARACTER/LINE WORK |
| 5 | 1 | 0 | 1 | 1 | 0 | PHOTOGRAPH |
| 6 | 1 | 1 | 0 | 1 | 1 | N/A |
| 7 | 1 | 1 | 1 | 1 | 1 | BLACK CHARACTER/LINE WORK |

FIG. 32

| PIXEL | PIXEL VALUE IN BINARY SYSTEM | | PIXEL VALUE ON FIRST PLANE | PIXEL VALUE ON SECOND PLANE | PIXEL VALUE ON THIRD PLANE | ATTRIBUTE |
|---|---|---|---|---|---|---|
| 0 | 0 | 0 | 0 | 0 | 0 | BACKGROUND (WHITE) |
| 1 | 0 | 0 | 0 | 0 | 1 | N/A |
| 2 | 0 | 1 | 0 | 1 | 0 | N/A |
| 3 | 0 | 1 | 0 | 1 | 1 | HALFTONE DOT |
| 4 | 1 | 0 | 1 | 0 | 0 | BLACK CHARACTER/ LINE WORK |
| 5 | 1 | 0 | 1 | 0 | 1 | PHOTOGRAPH |
| 6 | 1 | 1 | 1 | 1 | 0 | N/A |
| 7 | 1 | 1 | 1 | 1 | 1 | COLOR CHARACTER/ LINE WORK |

IMAGE PROCESSING DEVICE, IMAGE PROCESSING METHOD, AND STORAGE MEDIUM

This Nonprovisional application claims priority under 35 U.S.C. §119(a) on Patent Application No. 094987/2007 filed in Japan on Mar. 30, 2007, and Patent Application No. 033685/2008 filed in Japan on Feb. 14, 2008, the entire contents of which are hereby incorporated by reference.

FIELD OF THE INVENTION

The present invention relates to an image processing device that performs image processing with the use of attribute data indicative of an attribute of a pixel constituting an image, an image processing method, and a storage medium containing an image processing program.

BACKGROUND OF THE INVENTION

In recent years, an image processing device having a function of accumulating an image as electronic data, for example, a digital copying machine, has become prevalent. An increase in capacity of a memory device including a hard disk and reduction in cost of the memory device are considered to have influenced the prevalence of such an image processing device.

Such an image processing device includes an image processing device that performs image processing with the use of attribute data indicative of an attribute of a pixel constituting an image. One example of the image processing device is disclosed in Japanese Unexamined Patent Publication No. 211316/2001 (Tokukai 2001-211316) (published on Aug. 3, 2001). An image processing device as disclosed in Japanese Unexamined Patent Publication No. 211316/2001 accumulates image data inputted via a scanner and attribute data (flag data) generated from the image data in an auxiliary storage device such as a hard disk. These image data and attribute data are retrieved from the hard disk when the image is printed.

The attribute data is usually data indicative of an attribute (character, photograph, or the like) of each pixel, and used at a timing at which the image is printed or the like. In the following explanation, an attribute of a pixel is information, provided to each data, that indicates a region (for example, character region, photograph region, background region, or the like) to which the subject pixel belongs in the image.

One example of image processing is processing to switch a dither matrix in accordance with an attribute in a case where tone is reduced at printing. Note that information, other than information indicating a region to which a pixel belongs, may be attribute data as long as the information is useful in the image processing in a subsequent process.

Hereinafter, a term "attribute data" expresses data, indicative of an attribute of each pixel in an image or each region included in the image, which data is useful in such image processing.

The following explains what the attribute data is like, with reference to FIG. 28. FIG. 28 is a diagram illustrating one example of an input image 101. Suppose, for instance, that, as illustrated in FIG. 28, the input image 101 made of a photograph region, a character region, and a background region is provided. FIG. 29 is a diagram magnifying a sectional region 102 that is a part of the input image 101, for purpose of illustration.

The sectional region 102 is made of a character region 201 (made of pixels constituting each character of "UK"), a photograph region 202, and a background region 203. FIG. 30 is attribute data corresponding to the sectional region 102. The attribute data itself has a structure as an image data. Each pixel in the attribute data physically corresponds to a pixel of the input image data.

A region filled with the same pattern, as illustrated in FIG. 30, has the same pixel value (attribute value). Suppose, for instance, that, when a pixel belongs to a region 301 in which a horizontally-striped pattern is drawn, a pixel value of the pixel is 1. Moreover, when a pixel belongs to a region 302 in which a diagonally-striped pattern is drawn, a pixel value of the pixel is supposed to be 2. Further, when a pixel belongs to a region 303 in which a halftone dot pattern is drawn, a pixel value of the pixel is supposed to be 0. Provided that all values of the attribute data corresponding to the input image 101 is expressed by the values shown in FIG. 30, the values of the attribute data corresponding to the input image 101 can be expressed with three values.

Note that, although a resolution of this attribute data is arranged to be the same as that of the input image data in FIG. 30, the resolution of the input image data does not necessarily corresponds to the resolution of the attribute data as long as a category, to which each pixel in the image indicated by the input image data belongs, can be determined by the attribute data.

It is necessary to increase a storage region in order to accumulate image data of images with a large number of pages. However, in a case where the storage region cannot be increased, it is necessary to reduce a capacity necessary for each page.

A resolution of an image or the number of pixels of the image may be reduced, for reducing the storage region for an image per page. However, this is not preferable because information of the image may be lost when data is simply thinned.

This applies to both of the image data itself and the attribute data in the same way. However, in the case of image data, much research and development have been carried out with respect to a method of shrinking or expanding the image without deteriorating image quality. One example of the method is described in "New Edition: Image Analysis Handbook" (Tokyo University Press, published on Sep. 10, 2004, pp. 1350-1373).

Such a method is applicable basically when the pixel value of the image data does not have a specific meaning. On the other hand, different from the above case, in the attribute data, each pixel value (attribute value) itself has a meaning.

Suppose, for instance, that a specific meaning is given to a pixel value of attribute data, as illustrated in FIG. 31. FIG. 31 is a table illustrating how an attribute of a pixel of image data corresponds to a pixel value indicative of the attribute. Here, present two pixels respectively have a pixel value "3" (halftone dot) and a pixel value "5" (photograph), and an average value taken at the time of shrinking the attribute data in consideration of the present two pixels becomes "4", which is indicative of a color character. This shows that processing of shrinking the attribute data by calculating an average value of pixel values is meaningless.

Accordingly, Japanese Unexamined Patent Publication No. 211316/2001 (Tokukai 2001-211316) discloses a method of preventing loss of a specific value (e.x. 1) by using a nearest neighbor method and a logical addition method together at the time of shrinking the attribute data (flag data), a method of outputting 1 in a case where an appearance frequency of a specific value (e.x. 1) is counted around a target pixel and a result of the counting becomes equal to or more than a predetermined value, or the like.

However, according to the method as described in Japanese Unexamined Patent Publication No. 211316/2001, it is difficult to leave a pixel value that is desired to reliably remain in the attribute data. For example, according to the method based on the appearance frequency of the pixel value, possibility that a pixel value that is desired to remain remains is low in a case where the pixel value appears at a low appearance frequency.

Moreover, in a case where the method based on logical addition is applied to a multi-valued image that is made of a plurality of bit planes, all bits of the pixel value that is desired to reliably remain should be "1". Otherwise, the bits constituting the pixel value do not always remain depending on the bit plane. Accordingly, the pixel value that is originally desired to be stored is not ensured to remain. Therefore, according to the method based on logical addition, it is not easy to change a pixel value desired to remain. It is also difficult to give high priority to a plurality of pixel values.

Another problem is that, in a case where the attribute data is split into bit planes, encoding efficiency may deteriorate depending on how the pixel value is determined.

This point is explained below. Suppose, for instance, that, in a case where pixel values of the attribute data is given meanings, as illustrated in FIG. 31, a document made of a background and a black character/line work is inputted. When pixel values indicative of these two attributes are split into bit planes, the pixel values become different in all three bit planes. Accordingly, although, in the case of a text document, it is highly likely that two kinds of pixel values occupy majority of the document, it is not possible to produce bit planes having the same value in all area or bit planes close to the bit planes having the same value in all area. Therefore, it is not possible to increase encoding efficiency of the region separation map.

FIG. 32 shows a table in which the pixel value of the black character/line work is switched to a pixel value of a color character/line work, and vice versa. In this case, the problem in the case mentioned above can be solved. However, in the case of a color document, because it is likely that the color character/line work and background concurrently exist at a high appearance frequency, a problem similar to the problem mentioned above occurs. Therefore, it is not possible to increase encoding efficiency of the attribute data.

Japanese Unexamined Patent Publication No. 134570/1992 (Tokukai 4-134570, published on May 8, 1992) discloses a method of generating a shrank image that faithfully reproduces an original image. However, this patent application has no description concerning reduction of attribute data.

SUMMARY OF THE INVENTION

An object of the present invention is to provide an image processing device that can reduce attribute data while maintaining important information contained in the attribute data, and further to provide an image processing device that can increase encoding efficiency of the attribute data.

In order to solve the object above, an image processing device of the present invention includes: acquisition means acquiring image data; attribute data generation means generating attribute data including attribute values each indicative of an attribute to which each of a plurality of pixels constituting an image indicated by the image data acquired by the acquisition means belongs among predetermined attributes; and attribute data reduction means reducing the attribute data by converting, to one attribute value, at least two attribute values included in the attribute data generated by the attribute data generation means, according to a priority given to each of the attribute values.

An image processing method of the present invention includes the steps of: acquiring image data; generating attribute data including attribute values each indicative of an attribute to which each of a plurality of pixels constituting an image indicated by the image data acquired in the step of acquiring the image data belongs among predetermined attributes; and reducing the attribute data by converting, to one attribute value, at least two attribute values included in the attribute data generated in the step of generating attribute data, according to a priority given to each of the attribute values.

According to the arrangement, the attribute data generation means generates attribute data including attribute values each indicative of an attribute to which each of a plurality of pixels constituting an image indicated by the image data acquired by the acquisition means belongs. The attribute data reduction means reduces the attribute data by converting, to one attribute value, at least two attribute values included in the attribute data generated by the attribute data generation means, according to the priority given to each of the attribute values.

Therefore, it becomes possible to reduce the attribute data while the attribute value having a high priority is reliably remained.

A computer-readable storage medium of the present invention contains an image processing program to cause a computer to execute the steps of: acquiring image data; generating attribute data including attribute values each indicative of an attribute to which each of a plurality of pixels constituting an image indicated by the image data acquired in the step of acquiring the image data belongs among predetermined attributes; and reducing the attribute data by converting, to one attribute value, at least two attribute values included in the attribute data generated in the step of generating the attribute data, according to a priority given to each of the attribute values.

Therefore, it becomes possible to cause a computer to reduce the attribute data while the attribute value having a high priority is reliably remained.

For a fuller understanding of the nature and advantages of the invention, reference should be made to the ensuing detailed description taken in conjunction with the accompanying drawings.

BRIEF DESCRIPTION OF THE DRAWINGS

FIG. 5 is a diagram illustrating one example of a pixel value priority table.

FIG. 8 is a diagram illustrating one example of a pixel value conversion table.

FIG. 9 is a table illustrating pixel values before and after conversion by an image data shaping section.

FIG. 18 is a diagram illustrating one example of a pixel value conversion table that is used by the image data restoring section.

FIG. 25(a) is a diagram illustrating one example of a histogram generated by a histogram generating section.

FIG. 25(b) is one example of an appearance frequency order table generated by an appearance frequency order table generating section.

FIG. 26 is a diagram illustrating one example of an appearance frequency order/pixel value conversion table.

FIG. 28 is a diagram illustrating one example of an input image.

FIG. 31 is a table illustrating how an attribute of a pixel of image data corresponds to a pixel value indicative of the attribute.

FIG. 32 is another table illustrating how an attribute of a pixel of image data corresponds to a pixel value indicative of the attribute.

DESCRIPTION OF THE EMBODIMENTS

Embodiment 1

Figure 1:
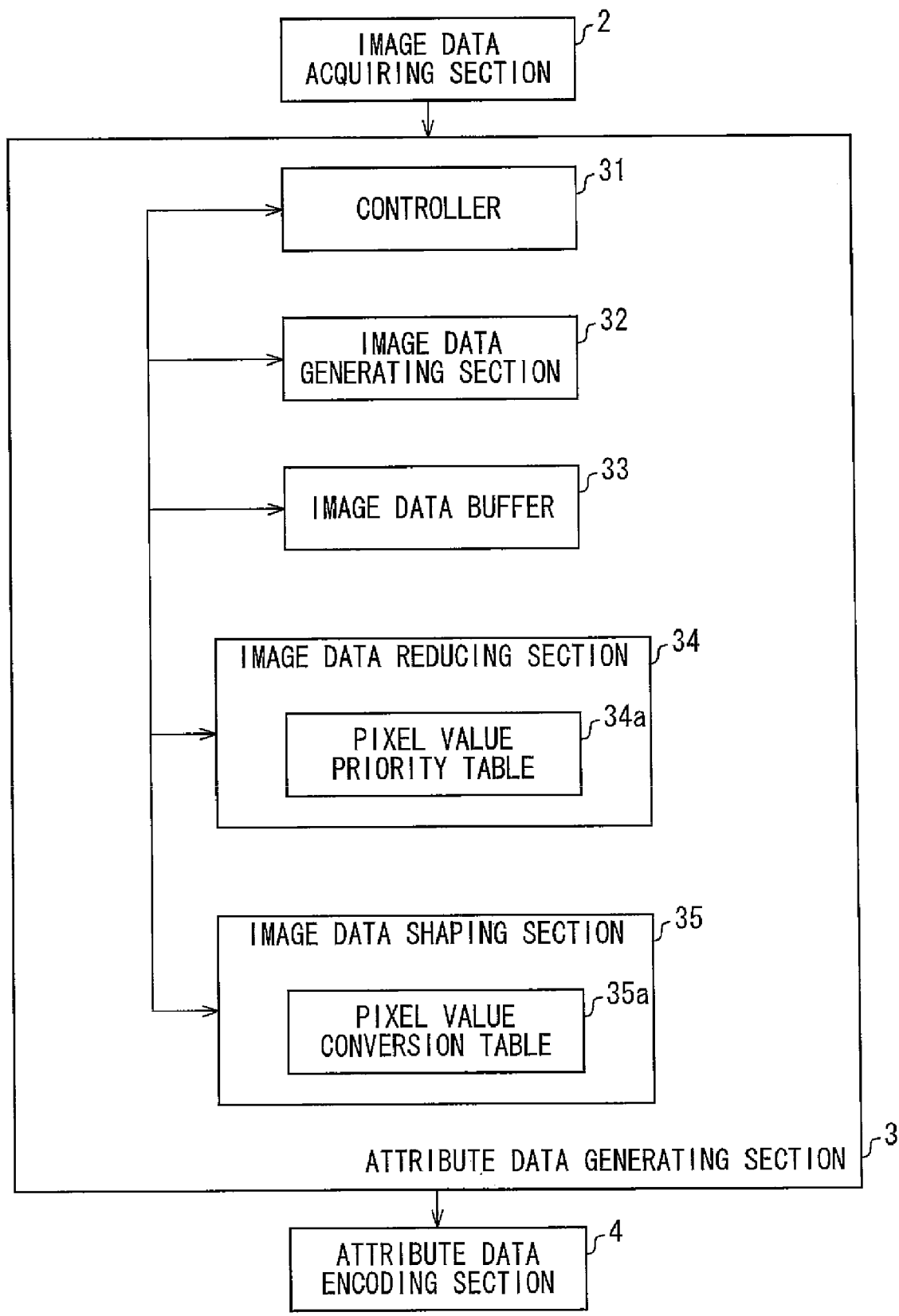
FIG. 1 is a functional block diagram illustrating an arrangement of an attribute data generating section included in an image processing device according to one embodiment of the present invention.
Figure 2:
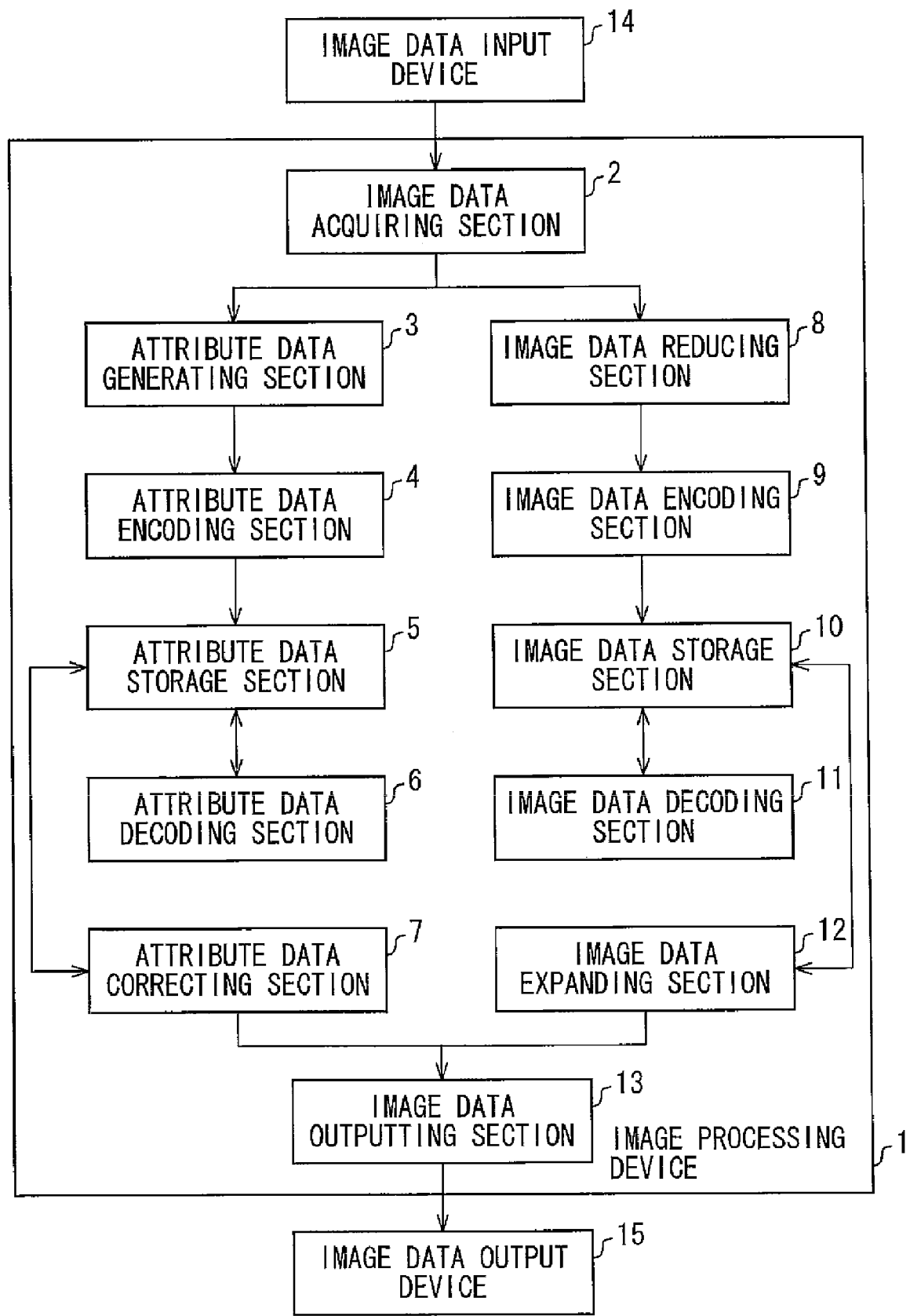
FIG. 2 is a functional block diagram illustrating an arrangement of the image processing device according to one embodiment of the present invention.

One embodiment of the present invention is explained below with reference to FIGS. 1 through 19.
[Arrangement of Image Processing Device 1]
FIG. 2 is a functional block diagram illustrating an arrangement of the image processing device 1 of the present embodiment. As illustrated in FIG. 2, the image processing device 1 includes an image data acquiring section (acquisition means) 2, an attribute data generating section (attribute data generation means, attribute data reduction means) 3, an attribute data encoding section 4, an attribute data storing section 5, an attribute data decoding section 6, an attribute data correcting section 7, an image data reducing section 8, an image data encoding section 9, an image data storage section 10, an image data decoding section 11, an image data expanding section 12, and an image data outputting section 13.

This image processing device 1 is communicably connected to an image data input device 14 and an image data output device 15. The image data input device 14 is a device for image data input. One example of the image data input device 14 is a scanner.

The image data acquiring section 2 acquires image data from the image data input device 14 and outputs this data to the attribute data generating section 3 and the image data reducing section 8.

The attribute data generating section 3 generates attribute data from the image data that is acquired by the image data acquiring section 2. The attribute data includes a pixel value (attribute value) indicative of an attribute to which each of a plurality of pixels constituting an image that is indicated by the image data belongs among predetermined attributes. A method of generating this attribute data is explained later in detail.

The attribute data encoding section 4 encodes the attribute data that is generated by the attribute data generating section 3, and stores the encoded attribute data in the attribute data storage section 5.

The attribute data decoding section 6 decodes the encoded attribute data, and stores the decoded attribute data in the attribute data storage section 5 again.

The attribute data correcting section 7 corrects the attribute data that is decoded by the attribute data decoding section 6. A method of correcting the attribute data is explained later.

The image data reducing section 8 reduces image data that is the same as the image data supplied to the attribute data generating section 3. A method of reducing the image data in the image data reducing section 8 may be an appropriate known method. In this embodiment, the image data reducing section 8 reduces the image data to ½ in vertical and horizontal directions, respectively.

The image data encoding section 9 encodes the image data that is reduced by the image data reducing section 8, and stores the encoded image data into the image data storage section 10. An encoding method that is used by the image data encoding section 9 may be an appropriate known method. Typical examples of the encoding method are a JPEG (Joint Photographic Experts Group) system and a PNG (Portable Network Graphic) system, but the encoding method is not limited to these.

The image data decoding section 11 decodes the image data that is encoded by the image data encoding section 9, and stores the decoded image data in the image data storage section 10. A decoding method used by the image data decoding section 11 corresponds to the encoding method used by the image data encoding section 9.

The image data expanding section 12 expands the image data that is decoded by the image data decoding section 11. For example, the image data expanding section 12 may use an appropriate image expanding method as mentioned above. In the present embodiment, corresponding to image data reduction to ½ in the vertical and horizontal directions, respectively, the image data is expanded twice as large in the vertical and horizontal directions, respectively. This is for making a resolution of the image that is inputted in the image data input device 14 become consistent with a resolution of an image to be ultimately outputted. If the consistency is not important, an expansion rate may be other than this. Depending on a purpose, the processing of the image expansion may be skipped.

The image data outputting section 13 acquires the attribute data that is corrected by the attribute data correcting section 7 and the image data that is expanded by the image data expanding section 12, and outputs these data to the image data output device 15.

The image data output device 15 outputs, as an image, the image data that is outputted from the image data outputting section 13, in accordance with the attribute data that is outputted from the image data outputting section 13. The image data output device 15 is typically a laser printer. In utilization of the attribute data here, as described in Japanese Unexamined Patent Publication No. 211316/2001, in accordance with a value of the attribute data, a subtractive color method at output may be changed or a coefficient used at color space conversion from a color space made of ROB to a color space made of CMYK may be changed. In accordance with a value of the attribute data, a degree of sharpness may also be changed.

[Process Flow in Image Processing Device 1]

Figure 3:
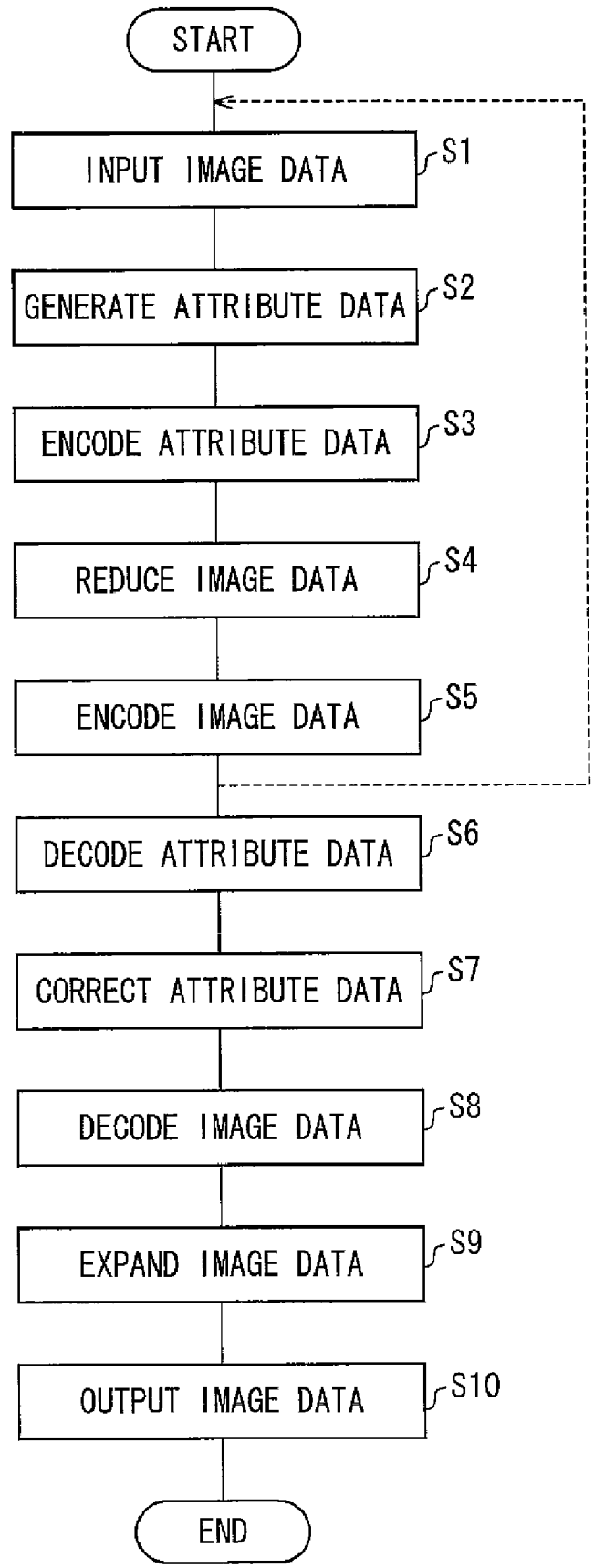
FIG. 3 is a flow chart illustrating one example of a process flow in the image processing device.

FIG. 3 is a flow chart illustrating one example of a process flow in the image processing device 1.

First, input image data is inputted via the image data input device 14. The image data input device 14 outputs this image data to the image data acquiring section 2 (step S1).

The image data acquiring section 2 acquires the image data from the image data input device 14, and outputs this image data to the attribute data generating section 3 and the image data reducing section 8.

The attribute data generating section 3 generates attribute data from the image data that is outputted from the image data acquiring section 2 (step S2), and outputs the generated attribute data to the attribute data encoding section 4.

The attribute data encoding section 4 encodes the attribute data that is generated by the attribute data generating section 3 (step S3), and stores the encoded attribute data in the attribute data storage section 5.

On the other hand, the image data reducing section 8 having received the image data that is outputted from the image data acquiring section 2 reduces the image data (step S4), and outputs the reduced image data to the image data encoding section 9.

The image data encoding section 9 having received the image data that is reduced by the image data reducing section 8 encodes the image data (step S5), and stores the encoded image data in the image data storage section 10.

In terms of practical application, it is important to allow an operation in which the image processing device 1 returns from the step S5 to the step S1 so that attribute data corresponding to a plurality of pages is accumulated in the attribute data storage section 5 and image data corresponding to a plurality of pages are stored in the image data storage section 10. However, because the operation is not important in view of understanding the present invention, the flow chart of FIG. 3 simply illustrates this operation by a dotted line.

In terms of practical application, it is important that cost of the image processing device 1 is reduced because increased efficiency in encoding of the attribute data (a data amount of the attribute data in an encoded state becomes small) makes it possible to reduce a capacity of the attribute data storage section 5 which capacity is necessary for storage of the attribute data. Moreover, the data amount reduced in this way generally makes it possible to carry out high-speed data transmission inside a device, and leads to an advantage of improving usability by shortening a waiting time of a user.

The attribute data decoding section 6 acquires, from the attribute data storage section 5, the attribute data that is encoded by the attribute data encoding section 4, and decodes the attribute data (step S6). The attribute data decoding section 6 stores the decoded attributed data in the attribute data storage section 5 again.

The attribute data correcting section 7 acquires, from the attribute data storage section 5, the attribute data that is decoded by the attribute data decoding section 6, and corrects the attribute data (step S7). The attribute data correcting section 7 outputs the corrected attribute data to the image data outputting section 13.

On the other hand, the image data decoding section 11 acquires, from the image data storage section 10, the image data that is encoded by the image data encoding section 9, and decodes the image data (step S8). The image data decoding section 11 stores the decoded image data into the image data storage section 10.

Subsequently, the image data expanding section 12 acquires, from the image data storage section 10, the image data that is decoded by the image data decoding section 11, and expands the image data (step S9). The image data expanding section 12 outputs the expanded image data to the image data outputting section 13.

The image data outputting section 13 acquires the attribute data that is corrected by the attribute data correcting section 7 and the image data that is expanded by the image data expanding section 12, and outputs these data to the image data output device 15 (step S10).

The image data output device 15 outputs, as an image, the image data that is outputted from the image data outputting section 13, in accordance with the attribute data that is outputted from the image data outputting section 13.

[Arrangement of Attribute Data Generating Section 3]

FIG. 1 is a functional block diagram illustrating an arrangement of the attribute data generating section 3. As illustrated in FIG. 1, the attribute data generating section 3 includes a controller 31, an image data generating section (attribute data generation means) 32, an image data buffer 33, an image data reducing section (attribute data reduction means) 34, and an image data shaping section 35. Each component is communicably connected via data bus to one another and also to an external component.

The controller 31 controls each component in the attribute data generating section 3.

The image data generating section 32 generates attribute data including a pixel value (attribute value) indicating an attribute, to which attribute each of the plurality of pixels constituting an image indicated by the image data acquired by the image data acquiring section 2 belongs among predetermined attributes, and stores the attribute data in the image data buffer 33. The image data generating section 32 may employ, as a method of generating attribute data, for example, various methods of image region separation as disclosed in Patent Document 1.

The following explanation assumes that the image data generating section 32 identifies a background, a halftone dot, a color character, a photograph, and a black character, and generates attribute data so as to form an image whose one pixel of the image data corresponds to one pixel of the attribute data. That is, a pixel value of a pixel in the attribute data is an attribute value indicative of an attribute of a pixel included in the image indicated by the image data. The pixel values included in the attribute data that is generated by the image data generating section 32 are, for example, values shown in a leftmost column in a table of FIG. 31.

The image data reducing section 34 reduces the attribute data that is generated by the image data generating section 32 and stored in the image data buffer 33, and stores the reduced attribute data in the image data buffer 33 again. More specifically, the image data reducing section 34 reduces the attribute data by replacing at least two pixel values (attribute values), that are included in the attribute data generated by the image data generating section 32, with one pixel value (attribute value) that is included in the attribute data and has higher priority, according to priority given in advance with respect to each attribute value. In other words, the image data reducing section 34 converts the at least two attribute values to one attribute value. A reduction method of this image data reducing section 34 is explained in detail later.

The image data shaping section 35 shapes the attribute data that is reduced by the image data reducing section 34, and outputs the shaped attribute data to the attribute data encoding section 4 via the controller 31. More specifically, the image data shaping section 35 converts the pixel value of the attribute data so as to increase possibility that entropy of each bit plane becomes small, that is, encoding efficiency is improved at the time when the attribute data is split into to bit planes.

[Process Flow in Attribute Data Generating Section 3]

Figure 4:
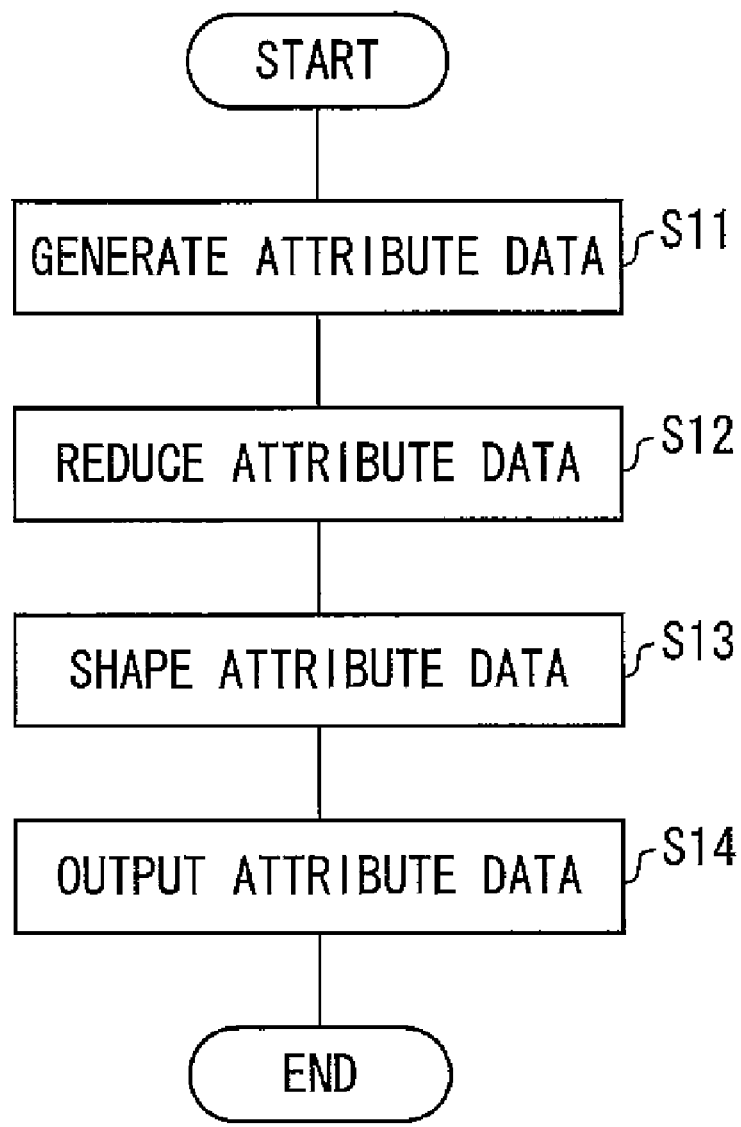
FIG. 4 is a flow chart illustrating one example of a process flow in the attribute data generating section.

FIG. 4 is a flow chart illustrating one example of a process flow in the attribute data generating section 3. A case where the controller 31 controls another component may not be described as such specifically, but may be described as a case in which operation of the another component is performed.

First, the controller 31 acquires image data from the image data acquiring section 2. Then, the controller 31 orders the image data generating section 32 to generate attribute data.

The image data generating section 32 having received this order generates attribute data from the image data that is outputted form the image data acquiring section 2, and stores the generated attribute data in the image data buffer 33 (step S1).

Subsequently, the image data reducing section 34 acquires, from the image data buffer 33, the attribute data that is generated by the image data generating section 32, and reduces this attribute data (step S12). Then, the image data reducing section 34 stores the reduced attribute data in the image data buffer 33 again.

Then, the image data shaping section 35 acquires, from the image data buffer 33, the attribute data that is reduced by the image data reducing section 34, and shapes the attribute data (step S13). Then, the image data shaping section 35 outputs the shaped attribute data to the attribute data encoding section 4 via the controller 31 (step S14).

[Method of Reducing Attribute Data in Image Data Reducing Section 34]

The image data reducing section 34 includes a pixel value priority table 34a. The image data reducing section 34 reduces the attribute data that is generated by the image data generating section 32, according to the pixel value priority table 34a. For example, the image data reducing section 34 reduces the attribute data by replacing attribute values of the attribute data which attribute data corresponds to a plurality of pixels included in a predetermined region (hereinafter referred to as a block) in the image acquired by the image data acquiring section 2, with one attribute value which has the highest priority among those of the attribute values of the plurality of pixels in the block. The number of attribute values that is to be replaced with one attribute value should be determined depending on a reduction ratio of the attribute data, as explained later.

The pixel value priority table 34a is a table for extracting a priority that is predetermined so as to correspond to an attribute of a pixel included in the image indicated by the image data. This extraction is carried out by using a key that is a value appropriate as a pixel value included in the attribute data. In other words, the pixel value priority table 34a is a table showing how an attribute of a pixel corresponds to a value indicative of a priority of the attribute. Accordingly, any table is sufficient as the pixel value priority table 34a as long as the table allows priorities of attributes to be extracted, for example, with values 0 through 7 as a key.

The following explanation is given based on the assumption that the priority is zero or a positive integer, and a larger value of priority means a higher priority.

The following explanation is given with reference to a table, schematically illustrated in FIG. 5, as the pixel value priority table 34a. FIG. 5 is a diagram illustrating one example of the pixel value priority table 34a. The pixel values illustrated in the pixel value priority table 34a in FIG. 5 correspond to the pixel values illustrated in the table shown in FIG. 31. Compared with FIG. 31, it is clear that a pixel value "7" (black character/line work) is given the highest priority "3". Moreover, a pixel value "4" (color character/line work) is given a priority "2", and a pixel value "5" (photograph) and a pixel value "3" (halftone dot) are given a priority "1". Further, a pixel value "0" (background) is provided with a priority "0". That is, a background having the pixel value "0" has the lowest priority.

In the pixel value priority table 34a illustrated in FIG. 5, a priority "0" is given to a pixel value (an "N/A" section in FIG. 31) to which no corresponding attribute is allocated. Any priority in such a section does not affect operation.

It is for convenience of an explanation that a larger pixel value is determined to have a higher priority in the pixel priority table 34a. On the contrary, a case where a smaller pixel value is determined to have a higher priority is also included in the scope of the present invention. What is important is that a priority is determined with respect to a pixel value of each pixel of attribute data.

Here, a method of expressing in the form of the pixel value priority table 34 is employed as a method of indicating priority of a pixel value. However, it is possible to use other expression, for example, embedment of a conditional statement in a program. Note that expression of priority of a pixel value in the form of a table has merit such that modification, such as switching of priorities, can be easily and reliably performed.

Moreover, the arrangement above assumes that contents of the pixel value priority table 34a is predetermined. However, the contents may be determined as appropriate according to one or a combination of contents of the attribute data or contents of the image data.

That is, the image processing device 1 may include a priority generating section (priority generation means, not shown) that determines a priority given to each attribute value of pixels of the image data, based on at least one of contents of the image data and contents of the attribute data. Further, the image data reducing section 34 may reduce the attribute data by converting at least two attribute values that is included in the attribute data generated by the image data generating section to one attribute data, according to the priority determined by the priority generating section.

For example, the priority generating section may give a higher priority to the pixel value "0" corresponding to the background, when a ratio of pixels that has a pixel value "7" corresponding to the black character in the attribute data generated by the image data generating section 32 is larger than a predetermined threshold value. This arrangement makes it possible to prevent the pixels that have the pixel value corresponding to the black character from occupying most of the attribute data that has been reduced.

Alternatively, the priority generating section may examine color distribution of pixels having a pixel value corresponding to the background in the attribute data, according to distribution of pixel values of the image data outputted from the image data acquiring section 2, and determine the priority based on the color distribution of the pixels.

For example, the priority generating section can have a different priority of the pixel corresponding to the black character in the attribute data, in each of a case where a bright color (high luminance) pixel occupies the background at a large ratio and a case where a dark color (low luminance) pixel occupies the background at a large ratio. In a case where the background is occupied by a dark color pixel, a priority of the black character may be set high because it is determined that needs for emphasizing the black character is high. On the other hand, in a case where the background is occupied by a bright color pixel, a priority of the black character may be set not to become high because it is determined that needs for emphasizing the black character is not high. It is obvious that this is simply an example, and what is important is that the priority can be determined as appropriate according to contents of the image data or the attribute data.

[Process Flow in Image Data Reducing Section 34]

Figure 6:
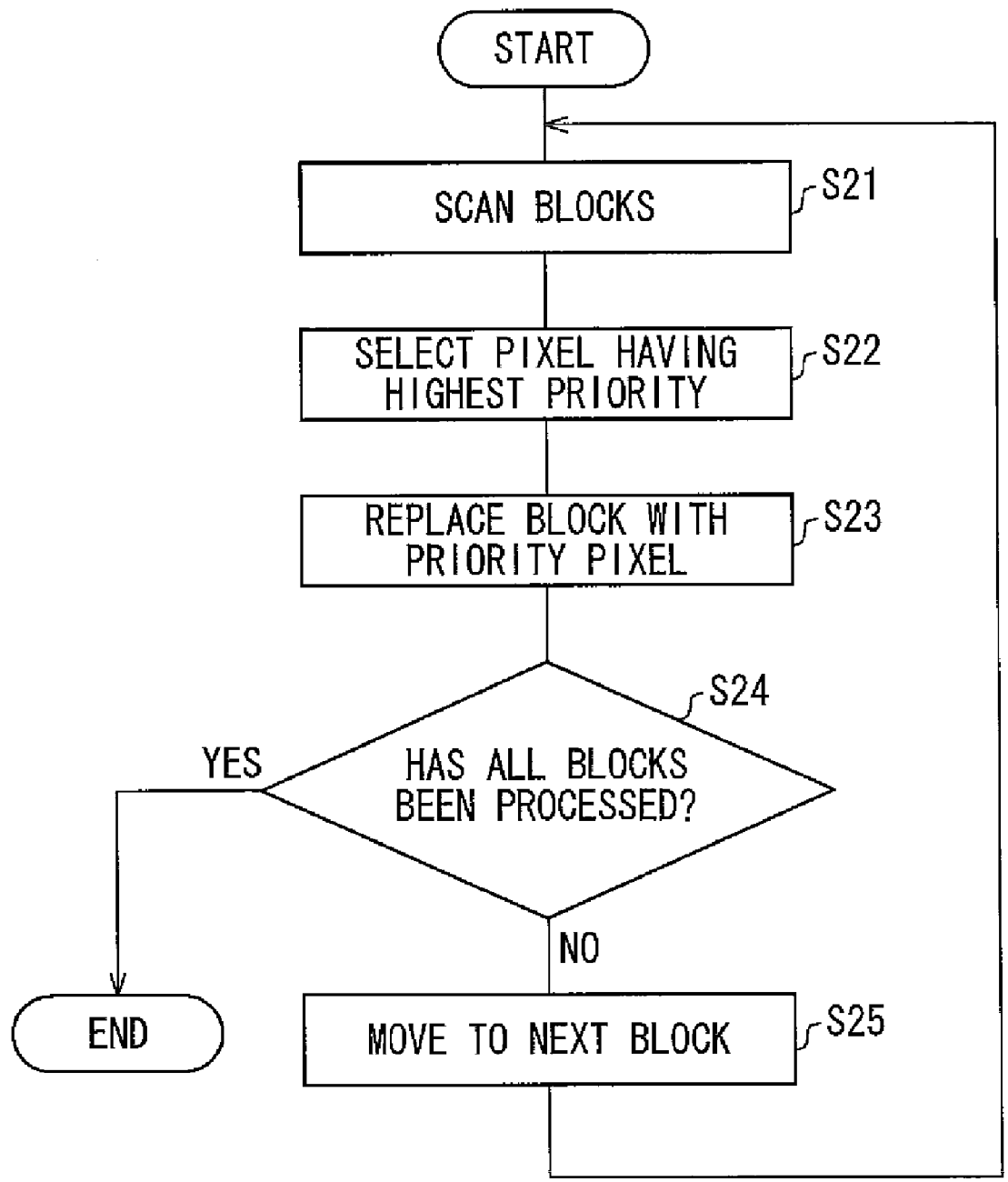
FIG. 6 is a flow chart illustrating one example of a process flow in an image data reducing section.

FIG. 6 is a flow chart illustrating one example of a process flow in the image data reducing section 34. First, the image data reducing section 34 scans the attribute data per block which attribute data is stored in the image data buffer 33 (step S21).

Figure 7:
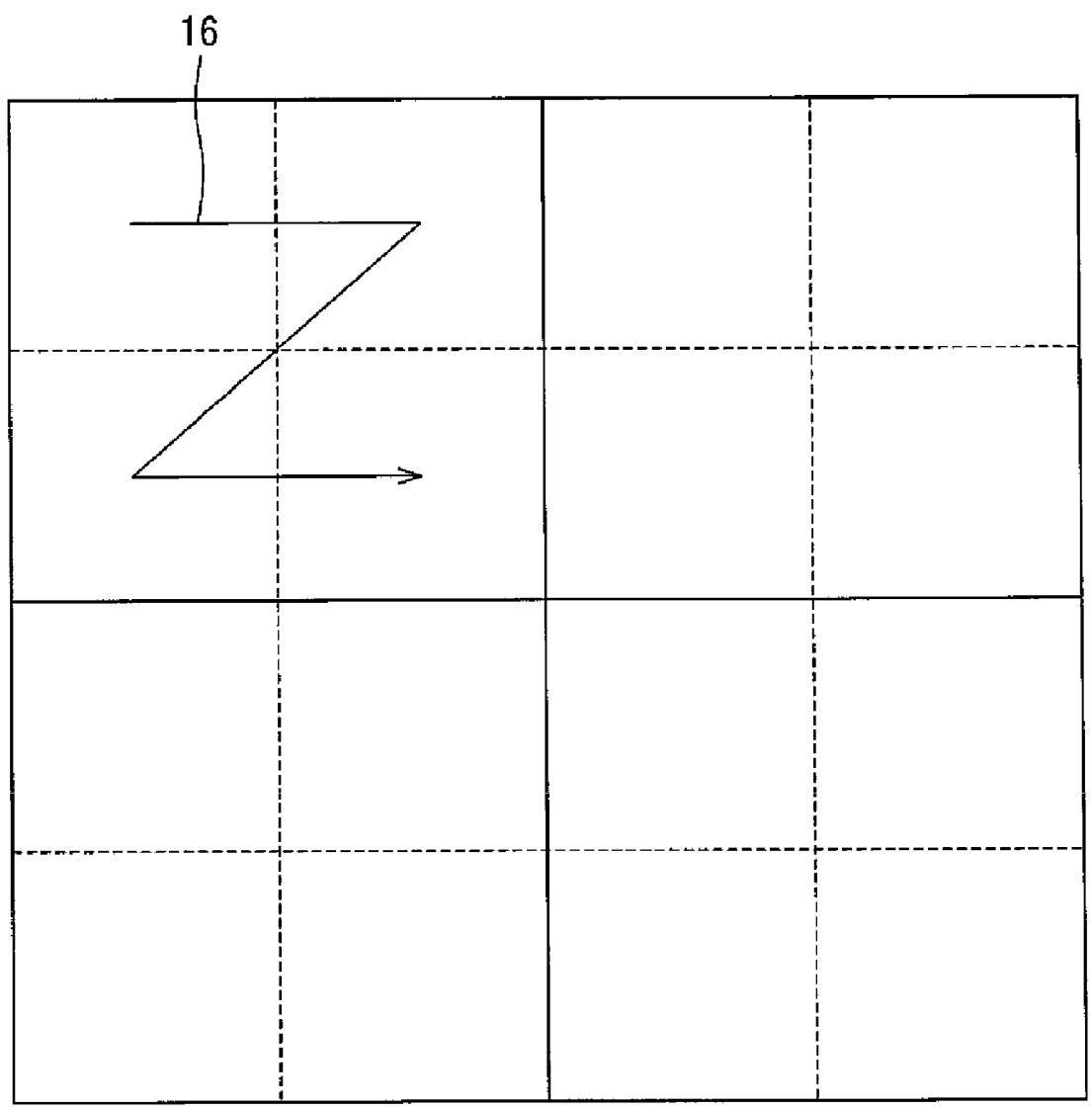
FIG. 7 is a diagram illustrating one example of a block of attribute data.

FIG. 7 is a diagram illustrating one example of a block of the attribute data. The block (predetermined region) here is determined by a reduction ratio of the attribute data. If the attribute data is reduced to ½ in vertical and horizontal directions, respectively, the block becomes a region made of 2 pixels (in a horizontal direction)×2 pixels (in a vertical direction) as illustrated in FIG. 7. That is, in a case where the attribute data is reduced to 1/N in vertical and horizontal directions, respectively, one side of the block becomes N pixels. The explanation below assumes that the attribute data is reduced at this reduction ratio.

FIG. 7 illustrates the attribute data stored in the image data buffer 33 as an image that has 4 pixels (in a vertical direction) ×4 pixels (in a horizontal direction), for simplifying the explanation. A block is formed by each region of 2 pixels (in a vertical direction) ×2 pixels (in a horizontal direction) which region is surrounded by a black frame. An arrow 16 shows an order in which scanning is performed by the image data reducing section 34. That is, the image data reducing section 34 extracts pixel values of a plurality of pixels in the block in a predetermined order.

The image data reducing section 34 selects a pixel value that indicates the highest priority among the pixel values included in the block (step S22).

The highest priority here is indicated in the pixel value priority table 34a explained above. For example, if a pixel value of a pixel in the attribute data is 7, a priority of the pixel is 3.

It is determined as a rule in advance that, in a case where a plurality of pixels has an identical priority, the one that appears earlier in the scanning order illustrated in FIG. 7 is given priority. It is obvious that such a rule may be determined in other way as long as the rule fits the purpose.

Next, the image data reducing section 34 replaces the pixel values of the pixels included in the block currently being processed, with the pixel value that is selected in the step 22 (step S23). This means that the attribute data is reduced because the block made of 2 pixels (in a horizontal direction)×2 pixels (in a vertical direction) is replaced with one pixel.

By reducing the attribute data according to priorities of pixels in this way, a pixel value (pixel value having a high priority) in the attribute data which pixel value is desired to remain can be reliably remained in reduction processing. This reduction method is particularly important in a case where, like the attribute data, the pixel value itself is given meaning, compared with a case where a normal image is reduced.

In particular, in a case where attribute data that is used with image data together is reduced as in the present invention, different from a case where the attribute data is independently reduced, a result of reducing the attribute data affects an output result of the image data. Accordingly, it has a significant effect to reduce attribute data according to a priority given to each pixel value.

Subsequently, the image data reducing section 34 determines whether all blocks have been processed (step S24). If all the blocks have not been processed (NO in step S24), the image data reducing section 34 starts processing of a next block (step S25) and returns to S21. If all the blocks have been processed (YES in step S24), the image data reducing section 34 ends a series of processing.

[Attribute Data Shaping Method in Image Data Shaping Section 35]

The image data shaping section 35 includes a pixel value conversion table 35a. This pixel value conversion table 35a is a table for replacing a pixel value to another value which pixel value is included in the attribute data stored in the image data buffer 33 and reduced by the image data reducing section 34. This replacement is carried out by using a key that is a value appropriate as the pixel value. Accordingly, any table is sufficient as the pixel value conversion table 35a as long as the table allows pixel values to be replaced by using, for example, the pixel values of 0 through 7 as a key with other pixel values of 0 through 7.

Here, values as illustrated in FIG. 8 are assumed as pixel values of the pixel value conversion table 35a. FIG. 8 is a diagram illustrating one example of the pixel value conversion table 35a. In the table of FIG. 8, the pixel value "1" is switched to a pixel value "7" and a pixel value "7" is switched to a pixel value "1".

An effect of this conversion of the pixel values is clearly shown in FIG. 9. FIG. 9 is a table illustrating pixel values before and after the conversion that is performed by the image data shaping section 35. As illustrated in FIG. 9, a bit pattern of the background (white) is made similar to a bit pattern of the black character/line work, so that each bit plane become as simple as possible by reducing a change in the pixel values in a bit plane expression of the image data in which a lot of pixels indicating the background or the character appear.

According to the converted pixel values (converted values) in FIG. 9, two out of three bit planes that express the attribute data do not show any change, if the attribute data includes only the black character/line work (pixel value "1") and the background (pixel value "0"). This is because the pixel value corresponding to the black character/line work becomes "1" due to the conversion of the pixel values by the image data shaping section 35.

In more general terms, the image data shaping section 35 converts the pixel values so that the conversion increases the possibility that the contents of the respective bit planes become simpler at the time when the attribute data is split into bit planes. This may be expressed in this specification as "the image data shaping section 35 converts the pixel values so as to be simpler, in terms of probability". Other than this, a case where a probability that a condition is realized is higher than a probability that the condition is not realized may be expressed by a term "in terms of probability". In other words, the image data shaping section 35 converts the pixel values so that the contents of the bit planes after conversion become simpler than those before the conversion, in terms of probability.

This reduces entropy of each bit plane at least in terms of probability, after the attribute data is split into bit planes. Accordingly, encoding efficiency increases. That is, an amount of data after encoding can be reduced. It is clearly on the assumption that pixels indicating the black character/line work and background occupy a majority of the pixels of the attribute data. However, even in a case where this assumption does not apply, a similar effect can be obtained by appropriately determining a method of converting the pixel values as long as a plurality of pixel values that appear at a high frequency can be selected.

Encoding by switching pixel values of the attribute data makes it possible to improve encoding efficiency of the attribute data.

Here, a conversion rule of the pixel values is expressed in the form of the pixel value conversion table 35a. However, the conversion rule of the pixel values may be expressed in another form of expression, for example, embedment of the conversion rule as a conditional statement in a program. Note that the expression in the form of a table has merit such that a change such as a change in the conversion rule can be performed easily and reliably.

[Process Flow in Image Data Shaping Section 35]

Figure 10:
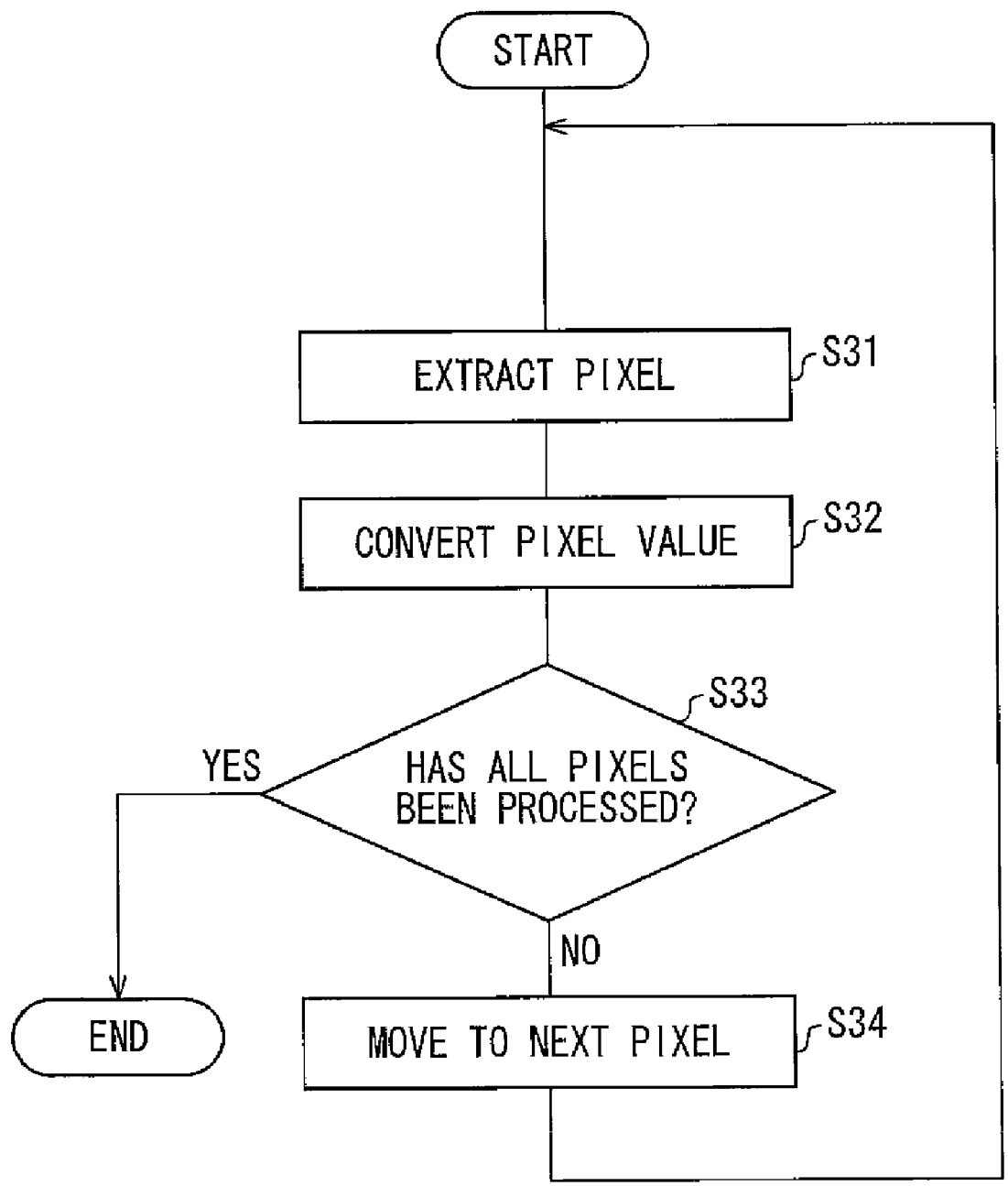
FIG. 10 is a flow chart illustrating one example of a process flow in the image data shaping section.

FIG. 10 is a flow chart illustrating one example of a process flow in the image data shaping section 35.

First, the image data shaping section 35 acquires, from the image data buffer 33, the attribute data that is reduced by the image data reducing section 34, and extracts pixel values from the attribute data (step S31).

The image data shaping section 35 converts the extracted pixel values of the pixels, according to the pixel value conversion table 35a (step S32). A method of converting the pixel values is considered to be clear from the explanation above, and thus the explanation here does not go into detail.

Then, the image data shaping section 35 determines if all pixels have been processed (step S33). If it is determined that all the pixels have not been processed (NO in step S33), the image data shaping section 33 starts processing of a next pixel (step S34), and returns to S31. On the other hand, if it is determined that all the pixels have been processed (YES in step S33), the image data shaping section 35 outputs, to the attribute data encoding section 4, the attribute data that is converted from the pixel values, and ends a series of processing.

[Arrangement of Attribute Data Encoding Section 4]

Figure 11:
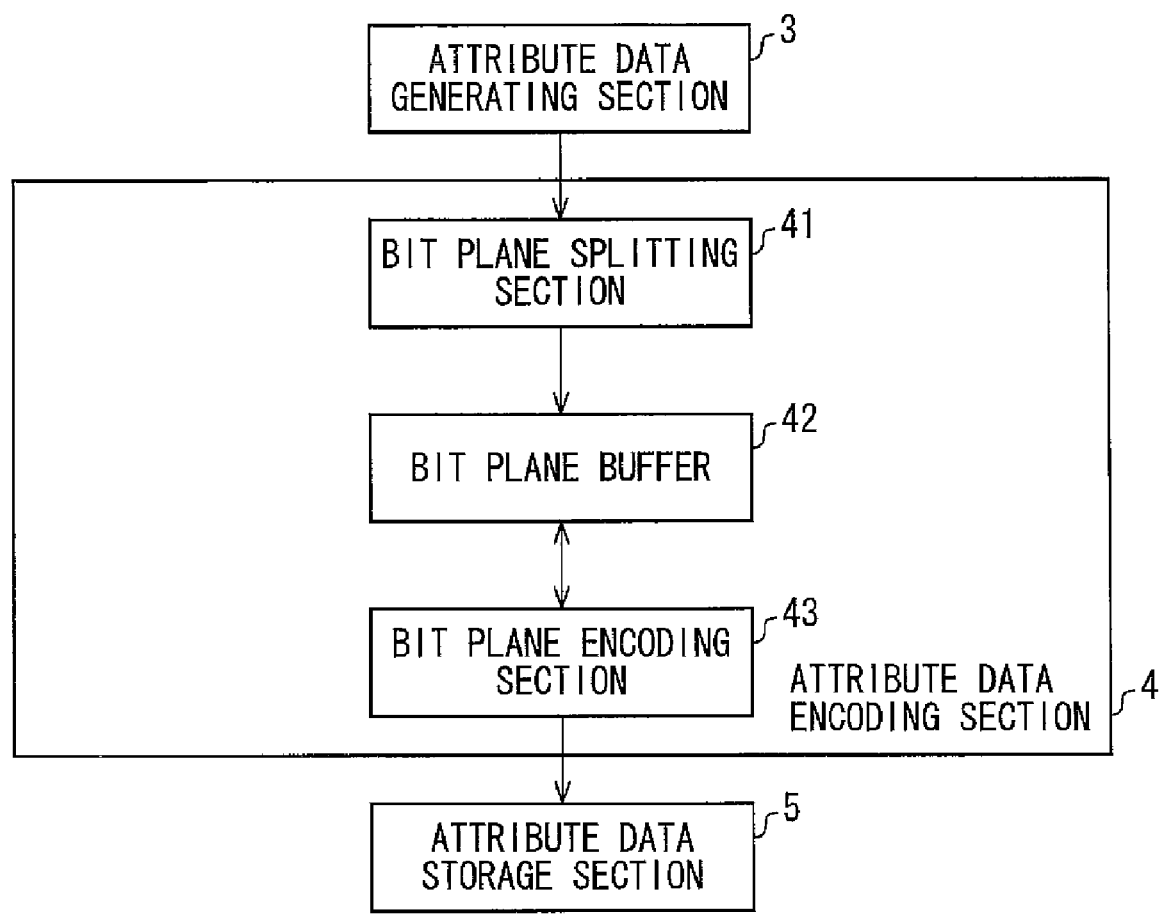
FIG. 11 is a functional block diagram illustrating an arrangement of an attribute data encoding section.

FIG. 11 is a functional block diagram illustrating an arrangement of the attribute data encoding section 4. As illustrated in FIG. 11, the attribute data encoding section 4 includes a bit plane splitting section 41, a bit plane buffer 42, and a bit plane encoding section 43. Each component of the attribute data encoding section 4 is communicably connected via data bus to one another and also to an external functional block.

The bit plane splitting section 41 acquires the attribute data that is shaped by the image data shaping section 35 of the attribute data generating section 3, and splits the attribute data into bit planes. The bit plane splitting section 41 stores, in the bit plane buffer 42, the attribute data that is split into bit planes. As a method of splitting the attribute data into pit planes, for example, as illustrated in FIG. 9, values in each row of "CONVERTED VALUE IN BINARY SYSTEM" may be stored into each bit plane.

The bit plane encoding section 43 encodes bit plane data of the attribute data that is split into bit planes by the bit plane splitting section 41 and stored in the bit plane buffer 42. An appropriate known technique can be employed for this encoding. Here, because the attribute data is split into bit planes, each bit plane indicates a binary image. Typical examples of the encoding method are JBIG (Joint Bi-level Image experts Group) and MMR (Modified Modified READ). An encoding method other than these may also be used.

Generally, in data encoding, the lower the entropy of the data is, the higher the encoding efficiency tends to become. Therefore, note that decrease in the entropy after conversion can be considered to mean increase in the encoding efficiency after conversion.

[Process Flow in Attribute Data Encoding Section 4]

Figure 12:
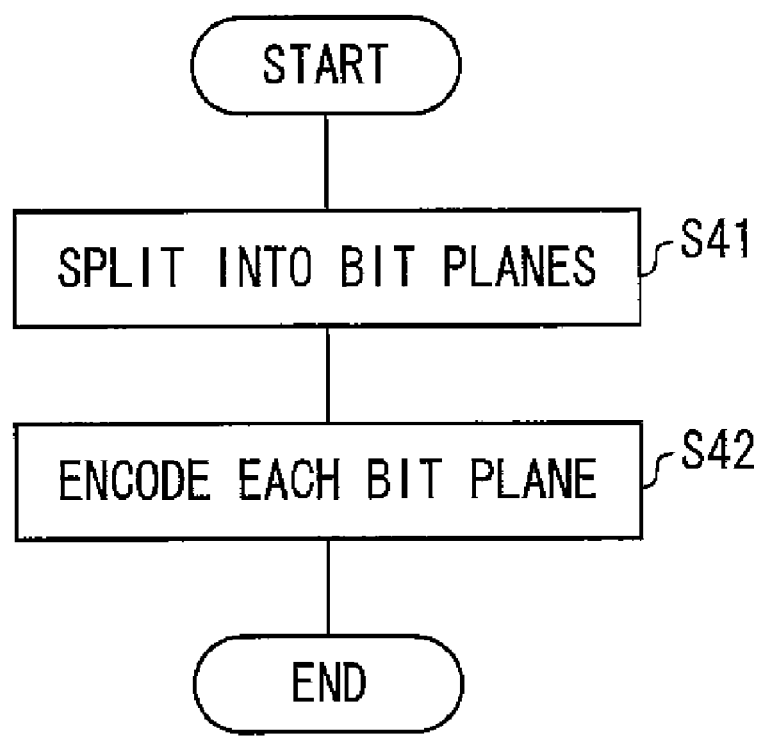
FIG. 12 is a flow chart illustrating one example of a process flow in the attribute data encoding section.

FIG. 12 is a flow chart illustrating one example of a process flow in the attribute data encoding section 4.

The bit plane splitting section 41 having acquired the attribute data from the attribute data generating section 3 splits the attribute data into bit planes, and stores the bit planes into the bit plane buffer 42 (step S41).

Then, the bit plane encoding section 43 encodes bit plane data that is stored in the bit plane buffer 42, and stores the encoded bit plane data into the attribute data storage section 5 (step S42).

Alternatively, in the bit plane encoding section 43, it is possible to carry out encoding of a multivalued image without splitting the attribute data into bit planes. In this case, it is desirable to carry out processing appropriate for encoding of the multivalued image as processing in the image data shaping section 35.

[Arrangement of Attribute Data Decoding Section 6]

Figure 13:
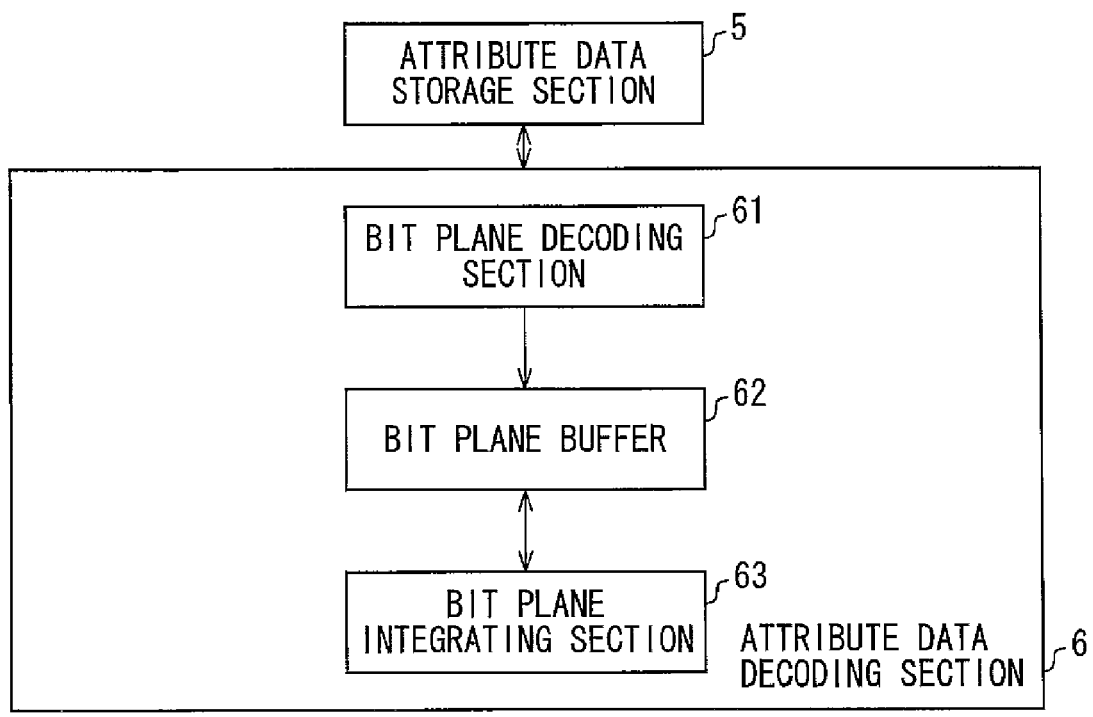
FIG. 13 is a functional block diagram illustrating an arrangement of an attribute data decoding section.

FIG. 13 is a functional block diagram illustrating an arrangement of the attribute data decoding section 6. As illustrated in FIG. 13, the attribute decoding section 6 includes a bit plane decoding section 61, a bit plane buffer, 62, and a bit plane integrating section 63. Each component is communicably connected via data bus to one another and also to an external component.

The bit plane decoding section 61 decodes the attribute data that is encoded by the attribute data encoding section 4, and stores the decoded attribute data into the bit plane buffer 62.

The bit plane integrating section 63 integrates the attribute data that is decoded and stored in the bit plane buffer 62 by the bit plane decoding section 61, thereby generating a multivalued image. A method of decoding the attribute data in the bit plane integrating section 63 is reverse processing with respect to the processing in the bit plane splitting section 41 and considered to be evident. Accordingly, explanation of the method does not go into detail here.

[Process Flow in Attribute Data Decoding Section 6]

Figure 14:
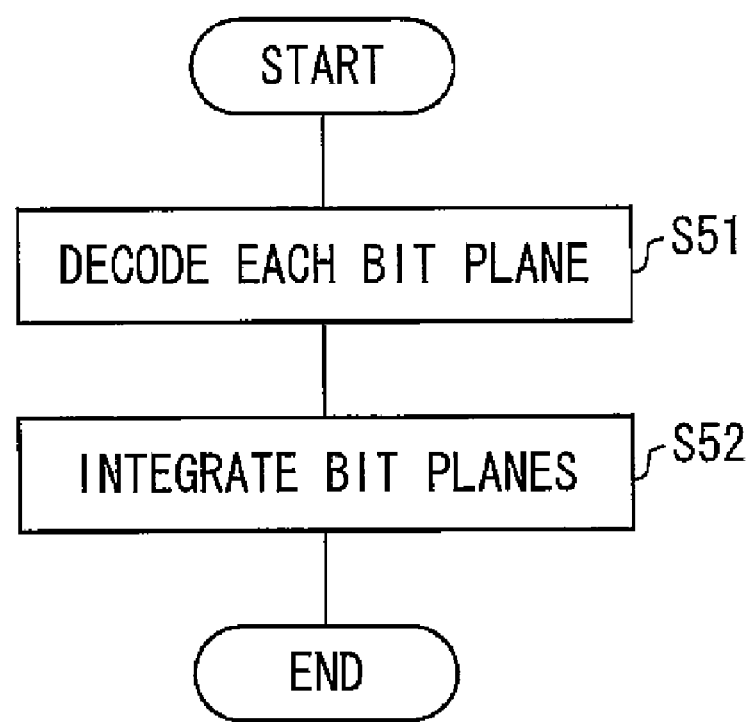
FIG. 14 is a flow chart illustrating one example of a process flow in the attribute data decoding section.

FIG. 14 is a flow chart illustrating one example of a process flow in the attribute data decoding section 6.

The bit plane decoding section 61 acquires, from the attribute data storage section 5, the attribute data that is encoded by the attribute data encoding section 4, and decodes bit plane data of this attribute data and stores the decoded bit plane data into the bit plane buffer 62 (step S51).

The bit plane integrating section 63 acquires, from the bit plane buffer 62, the attribute data that is decoded by the bit plane decoding section 61, and integrates the attribute data to generate a multivalued image (step S52). The bit plane integrating section 63 stores the generated multivalued image in the attribute storage section 5.

[Arrangement of Attribute Data Correcting Section 7]

Figure 15:
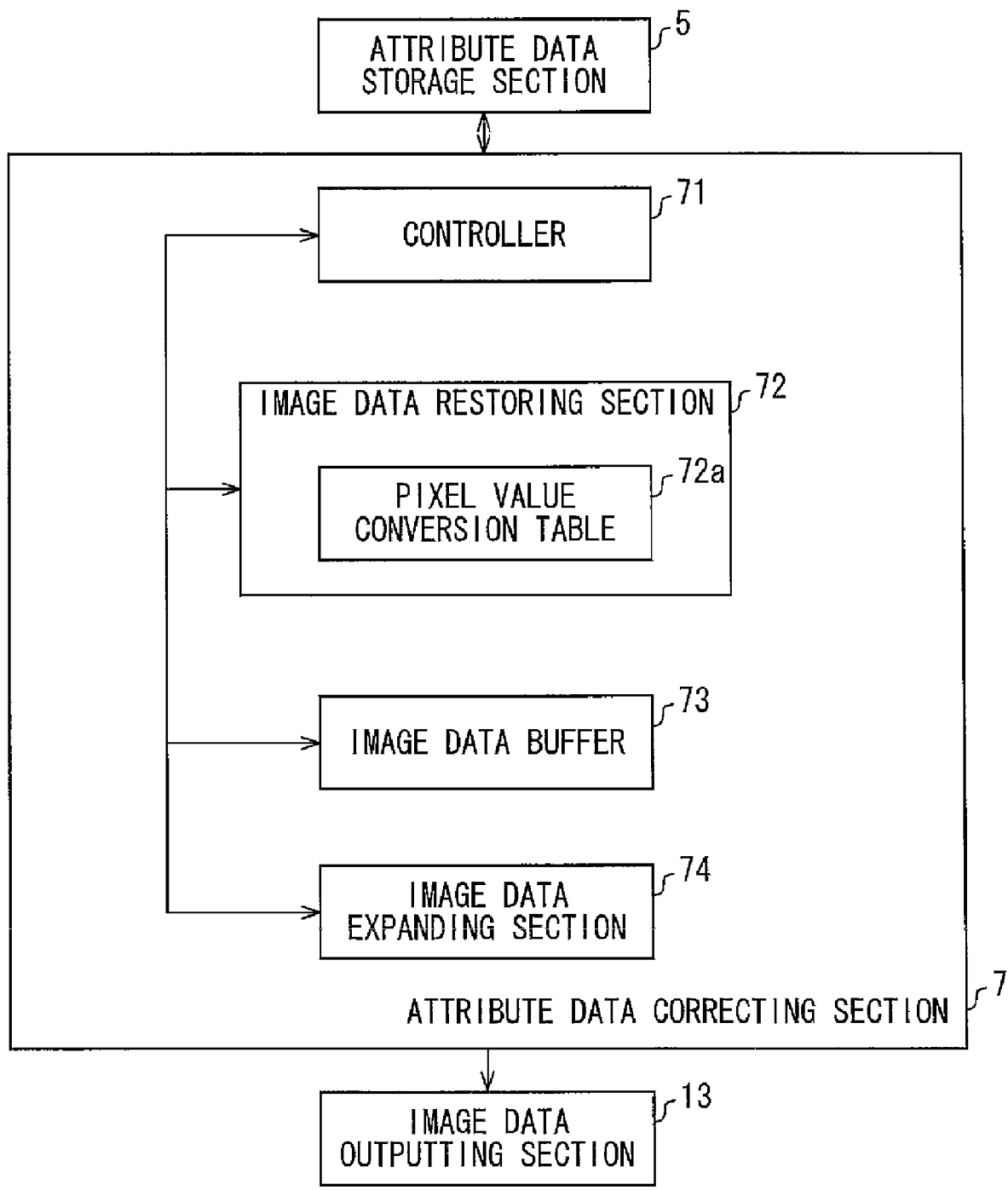
FIG. 15 is a functional block diagram illustrating an arrangement of an attribute correcting section.

FIG. 15 is a functional block diagram illustrating an arrangement of the attribute data correcting section 7. As illustrated in FIG. 15, the attribute data correcting section 7 includes a controller 71, an image data restoring section 72, an image data buffer 73, and an image data expanding section 74. Each component is communicably connected via data bus to one another and also to an external component.

The controller 71 controls each component of the attribute data correcting section 7.

The image data restoring section 72 restores the attribute data (multivalued image) that is decoded by the attribute data decoding section 6 and stored in the attribute data storage section 5, and stores the restored attribute data in the image data buffer 73. Restoration processing in the image data restoring section 72 is explained in detail later.

Figure 16:
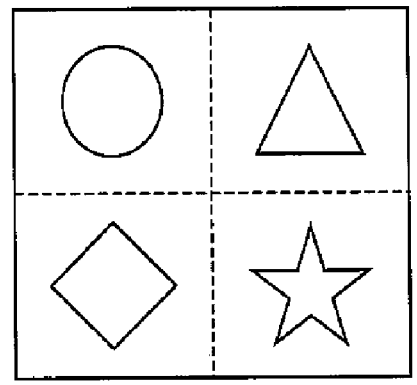
FIG. 16 is a diagram illustrating one example of a method of expanding attribute data in an image data expanding section.
Figure 16:
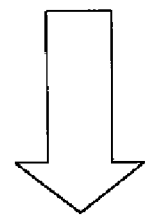
Figure 16:
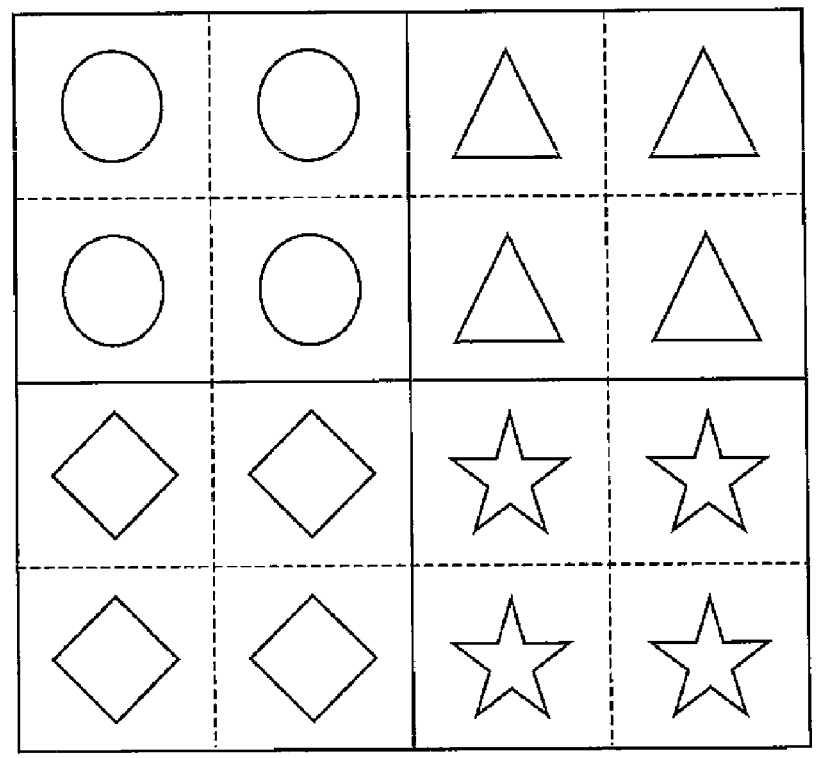

The image data expanding section 74 expands the attribute data that is restored and stored in the image data buffer 73 by the image data restoring section 72. In the present embodiment, simple expansion as schematically illustrated in FIG. 16 is performed as one example of processing in the image data expanding section 74. FIG. 16 is a diagram illustrating one example of a method of expanding the attribute data in the image data expanding section 74. FIG. 16 shows a state before expansion of the attribute data and a state after the expansion of the attribute data. In the example as illustrated in FIG. 16, each of four pixels constituting the attribute data is expanded fourfold (increased to four pixels). The expanded attribute data is made of 16 pixels in total. FIG. 16 illustrates an example of simple attribute data made of the small number of pixels, for explanation. Please note that normally the number of pixels constituting the attribute data is much larger.

[Process Flow in Attribute Data Correcting Section 7]

Figure 17:
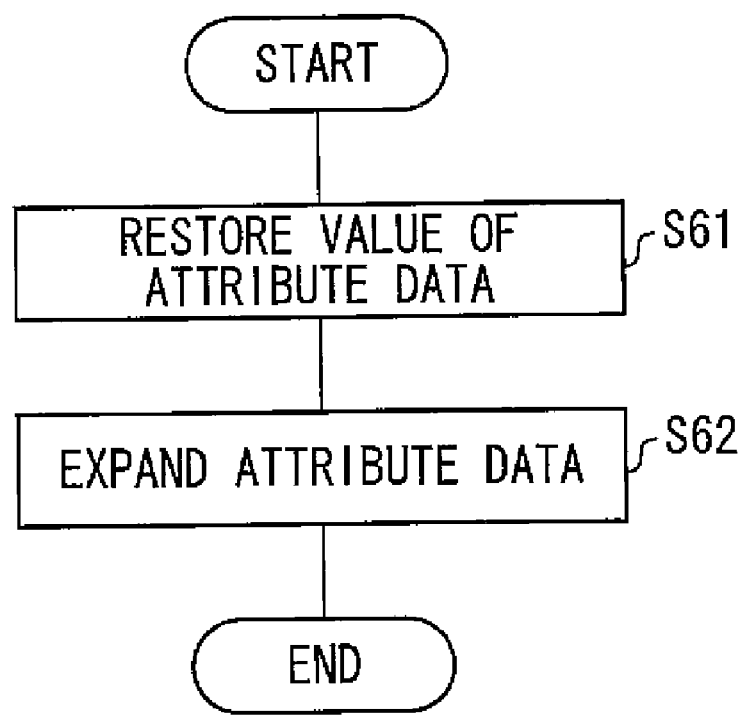
FIG. 17 is a flow chart illustrating one example of a process flow in the attribute data correcting section.

FIG. 17 is a flow chart illustrating one example of a process flow in the attribute data correcting section 7. In the following explanation, a case where the controller 71 controls another component may not described specifically as such but described as a case where operation of the component is performed.

The image data restoring section 72 acquires, from the attribute data storage section 5, the attribute data that is decoded by the attribute data decoding section 6, and restores the attribute data and stores the restored attribute data into the image data buffer 73 (step S61).

Then, the image data expanding section 74 acquires, from the image data buffer 73, the attribute data that is restored by the image data restoring section 72, and expands the attribute data (step S62). The image data expanding section 74 outputs the expanded attribute data to the image data outputting section 13.

[Decoding Process in Image Data Restoring Section 72]

The image data restoring section 72 includes a pixel value conversion table 72*a*. This pixel value conversion table 72*a* is a table for performing a reverse conversion of pixel value conversion that is performed according to the pixel value conversion table 35*a* included in the image data shaping section 35, or a conversion having an effect similar to that of the reverse conversion.

The image data restoring section 72 converts a pixel value of the attribute data to another pixel value which pixel value of the attribute data is decoded and stored in the attribute data storage section 5 by the attribute data decoding section 6. The conversion is performed by using a key that is a value appropriate as the pixel value. Here, any section is sufficient as the image data restoring section 72 as long as the section is capable of converting a pixel value of 0 through 7 as a key to another pixel value of 0 through 7. FIG. 18 schematically shows one example of contents of the image value conversion table 72*a* corresponding to a reverse conversion of a conversion performed according to the pixel value conversion table 35*a* (refer to FIG. 8).

In this case, because the conversion of pixel values with the use of the pixel value conversion table 35*a* is simple switching of the pixel values, the conversion by using the pixel value conversion table 72*a* carries out a reverse conversion of the conversion using the pixel value conversion table 35*a*. Accordingly, the pixel value conversion table 35*a* and the pixel value conversion table 72*a* may be integrated to one table. It is rather better to integrate the tables because the integration may contribute to reduction in a hardware scale.

[Process Flow in Image Data Restoring Section 72]

Figure 19:
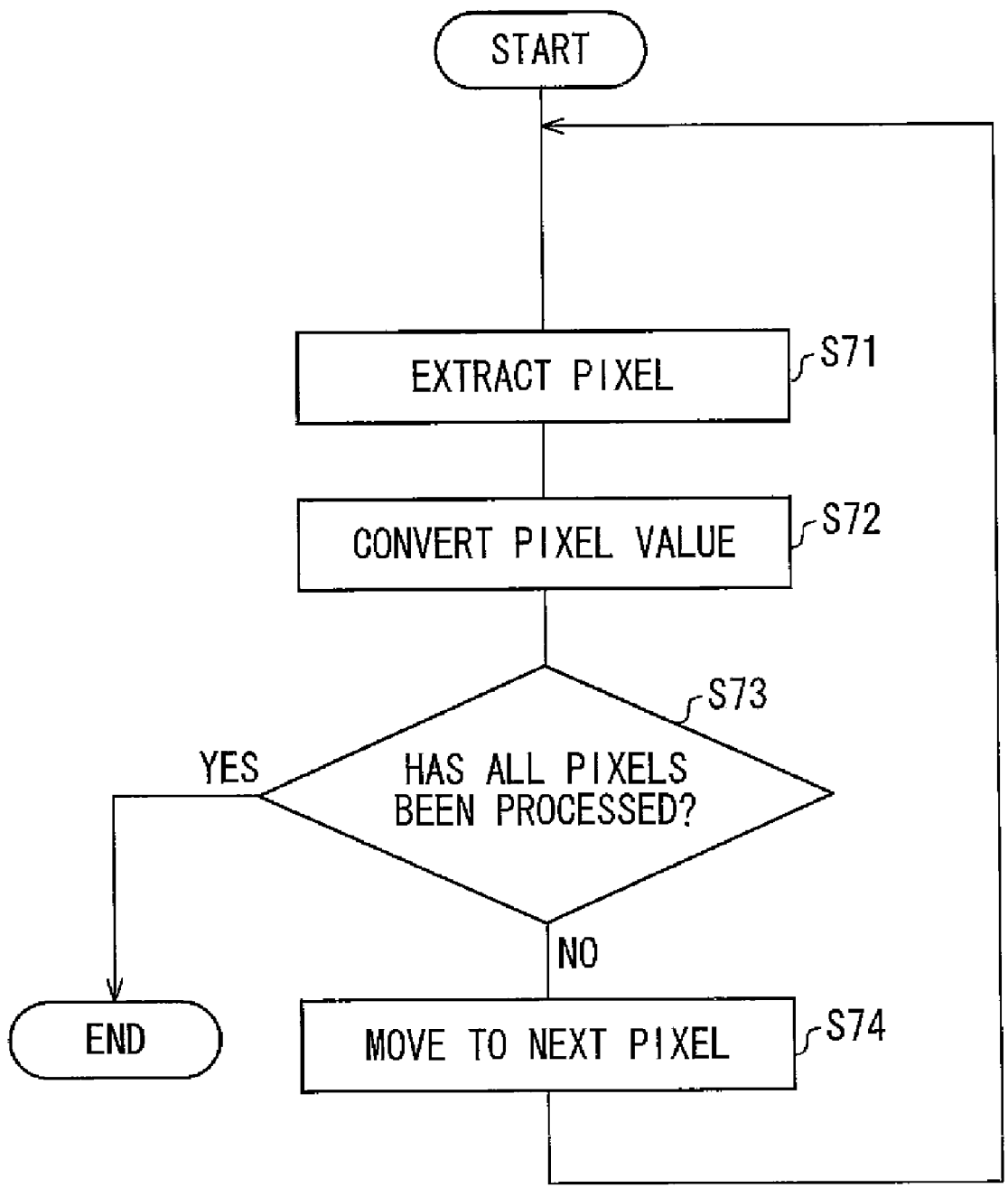
FIG. 19 is a flow chart illustrating one example of a process flow in the image data restoring section.

FIG. 19 is a flow chart illustrating one example of a process flow in the image data restoring section 72.

First, the image data restoring section 72 extracts pixel values of pixels from the attribute data that is decoded and stored in the attribute data storage section 5 by the attribute data decoding section 6 (step S71).

The image data restoring section 72 converts the pixel values according to the pixel value conversion table 72*a* (step S72). How to convert the pixel values is clear from the above explanation, and the explanation does not go into detail here.

Then, the image data restoring section 72 determines if all pixels have been processed (step S73). If it is determined that all the pixels have been not processed (NO in step S73), the image data restoring section 72 starts the processing of a next pixel (step S74), and returns to S71. If it is determined that all the pixels have been processed (YES in step S73), the image data restoring section 72 stores the restored attribute data in the image data buffer 73, and ends a series of processing.

Modification Example

A reduction ratio of the image data in the image data reducing section 8 and a reduction ratio of the attribute data of the image data reducing section 34 are arranged to be the same reduction ratio that is ½ in the vertical direction and the horizontal direction, respectively. However, the reduction ratio of the image data reducing section 8 does not need to be the same as the reduction ratio of the image data reducing section 34, if no difficulty occurs in processing in the image data output device 15.

It is clear that an operation of "selecting a pixel having the highest priority" in the image data reducing section 34 is possible even when the reduction ratio is in the form of 1/N other than ½. That is, the reduction ratio of the attribute data in the image data reducing section 34 is not limited to ½.

The operation of other components included in the image processing device 1 of the present embodiment should be understood based on the explanation above and the known technique. Accordingly, explanation thereof does not go into detail here.

As mentioned above, the image processing device 1 of the present embodiment prevents an increase in a storage capacity necessary for storing image data while keeping image quality, by performing pixel value conversion. The pixel value conversion is carried out according to the priority of the attribute in reduction and encoding of the attribute data, generated from the image data, that indicates an attribute of each pixel of an image or an attribute of each region of the image.

Note that the image processing device 1 may be expressed as follows.

In other words, the image processing device 1 is an image processing device including an image data acquiring section 2 that acquires an image and an image data generating section 32 that generates attribute data including an attribute value indicative of an attribute to which each of the plurality of pixels constituting the image acquired by the image data acquiring section 2 belongs among predetermined attributes. In the image processing device 1, each of the attribute values is expressed as a binary value and split into a plurality of bit planes at the same time. The image processing device 1 further includes an image data shaping section (attribute value conversion means) 35 that converts the attribute value so as to increase possibility of decreasing entropy of each of the bit planes or decreasing at least the entropy. The expression "decreasing entropy" may also be expressed as "increasing encoding efficiency".

Moreover, it is preferable that the image processing device 1 includes both the image data reducing section 34 and the image data shaping section 35. Alternatively, the image processing device 1 may include one of the image data reducing section 34 and the image data shaping section 35. For example, in a case where the image processing device 1 does not include the image data reducing section 34 but includes the image data shaping section 35, it is possible to obtain at least an effect such that encoding efficiency of the attribute data can be increased.

Because giving meaning itself to the attribute does not affect an operation principle of the present invention, as clear from the explanation above, there is no problem to apply the present invention to attribute data having contents that are not explained here. For example, the present invention is applicable to an arrangement in which a pixel of attribute data as another example of the attribute data does not specify a region but directly specifies a kind of a dither matrix. It is also possible to provide attribute data, as a still another example of the attribute data, with a value that is not a pixel value but indicative of a kind of gradation (e.x. a direction in which density varies) as information used to constitute the image. It is clearly necessary that contents of such attribute data can be validly used in the image data outputting section 13.

Embodiment 2

The following explains another embodiment of the present invention with reference to FIGS. 20 through 27. Note that members given the same reference numerals as the members as in Embodiment 1 respectively have identical functions and the explanations thereof are omitted.

Figure 20:
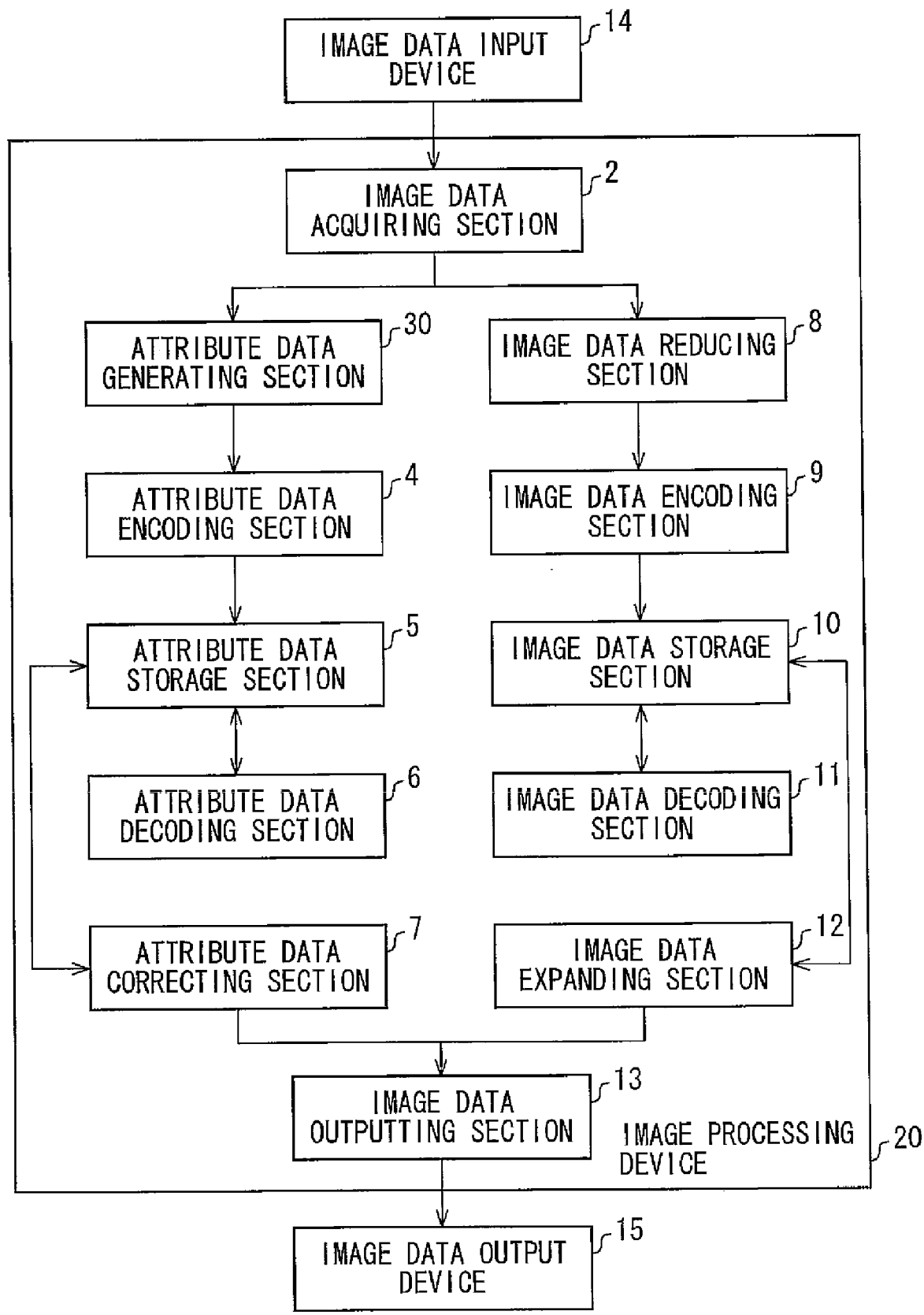
FIG. 20 is a functional block diagram illustrating an arrangement of the image processing device according to another embodiment of the present invention.

FIG. 20 is a functional block diagram illustrating an arrangement of an image processing device 20. As illustrated in FIG. 20, different from an image processing device 1, the image processing device 20 includes an attribute data generating section 30.

The image processing device 20 of the present embodiment according to the present embodiment is similar to the image processing device 1, but the image processing device 20 is different from the image processing device 1 in that contents of a pixel value conversion table 35a that is fixed in the image processing device 1 is changed as appropriate according to contents of attribute data.

The following explains only a part necessary for understanding of the present invention because most components included in the image processing device 20 are the same as components of the image processing device 1 or easily understood by analogy with the image processing device 1.

Figure 21:
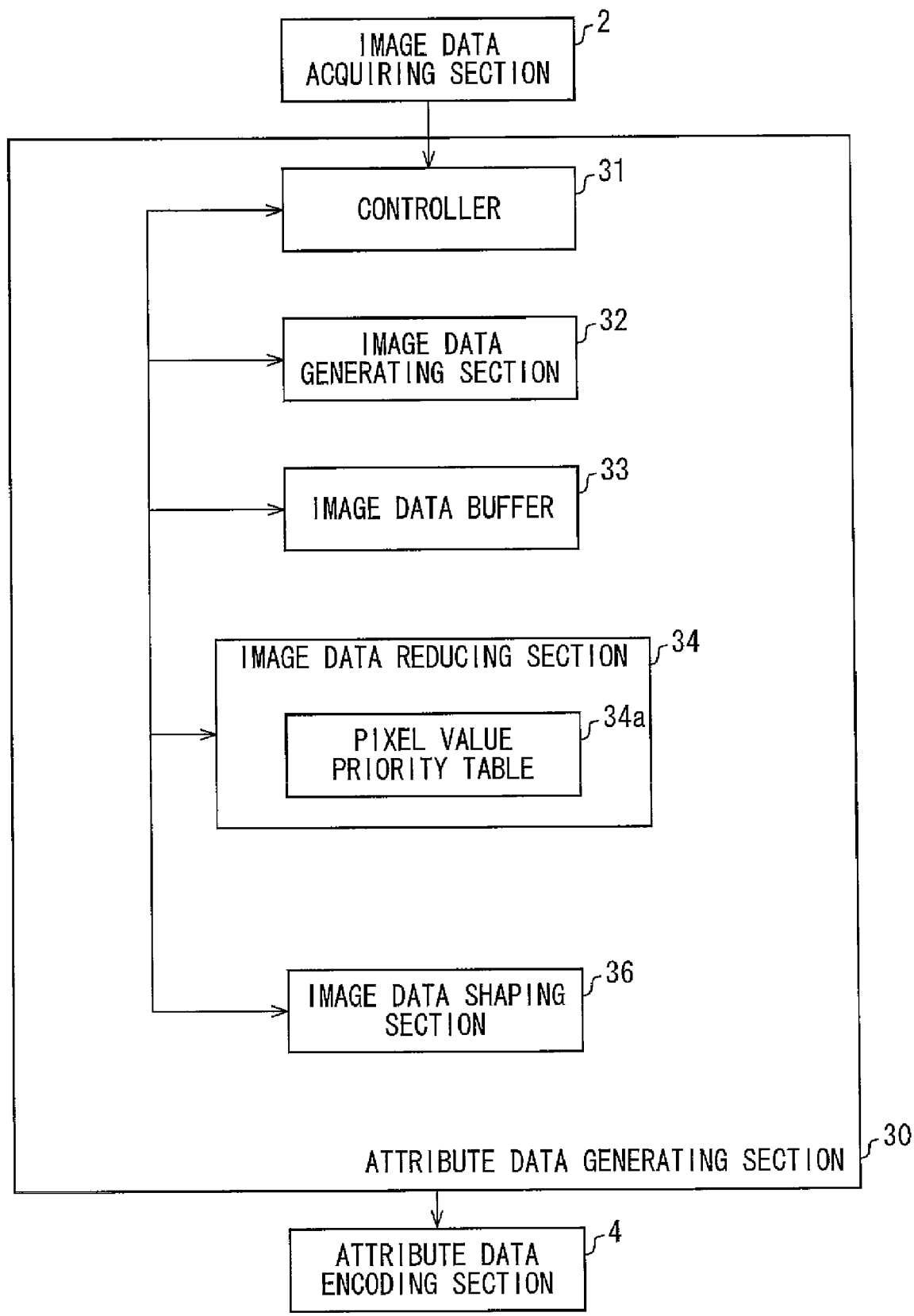
FIG. 21 is a functional block diagram illustrating an arrangement of an attribute data generating section included in the image processing device.

FIG. 21 is a functional block diagram illustrating an arrangement of an attribute data generating section 30. As illustrated in FIG. 21, different from an attribute data generating section 3, the attribute data generating section 30 includes an image data shaping section 36.

[Arrangement of Image Data Shaping Section 36]

Figure 22:
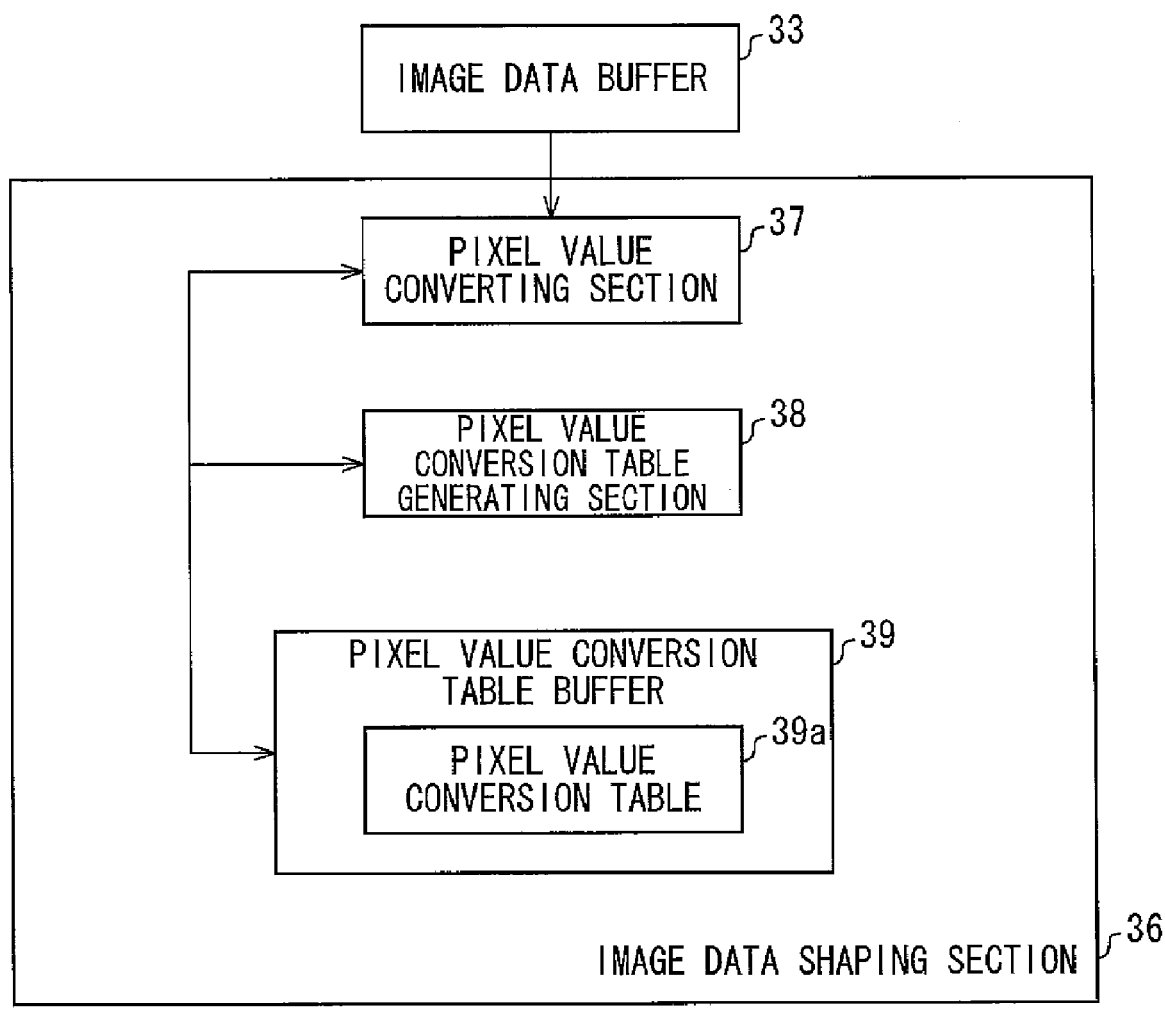
FIG. 22 is a functional block diagram illustrating an arrangement of an image data shaping section included in the image processing device.

FIG. 22 is a functional block diagram illustrating an arrangement of the image data shaping section 36. As illustrated in FIG. 22, the image data shaping section 36 includes a pixel value converting section 37, a pixel value conversion table generating section 38, and a rewritable pixel value conversion table buffer 39 in which a pixel value conversion table 39a is stored. Each component is communicably connected via data bus with one another and also connected to an external component.

The pixel value converting section 37 extracts a pixel value from attribute data that is reduced by an image data reducing section 34, and converts the extracted pixel value according to the pixel value conversion table 39a that is generated by the pixel value conversion table generating section 38. A method of this conversion is the same as a method of converting a pixel value in an image data shaping section 35. Therefore, explanation does not go in detail here.

The pixel value table generating section 38 generates the pixel value conversion table 39a, and stores this pixel value conversion table 39a into the pixel value conversion table buffer 39. More specifically, the pixel value conversion table generating section 38 converts the pixel value conversion table 39a that the pixel value converting section 37 uses, according to an appearance frequency at which an attribute of the pixel value included in the attribute data appears. Further, in other words, the pixel value conversion table generating section 38 converts the pixel values so that bit plane patterns of the pixel values that appear at a high frequency look similar to each other. This pixel value conversion table generating section 38 is explained in detail later.

[Process Flow in Image Data Shaping Section 36]

Figure 23:
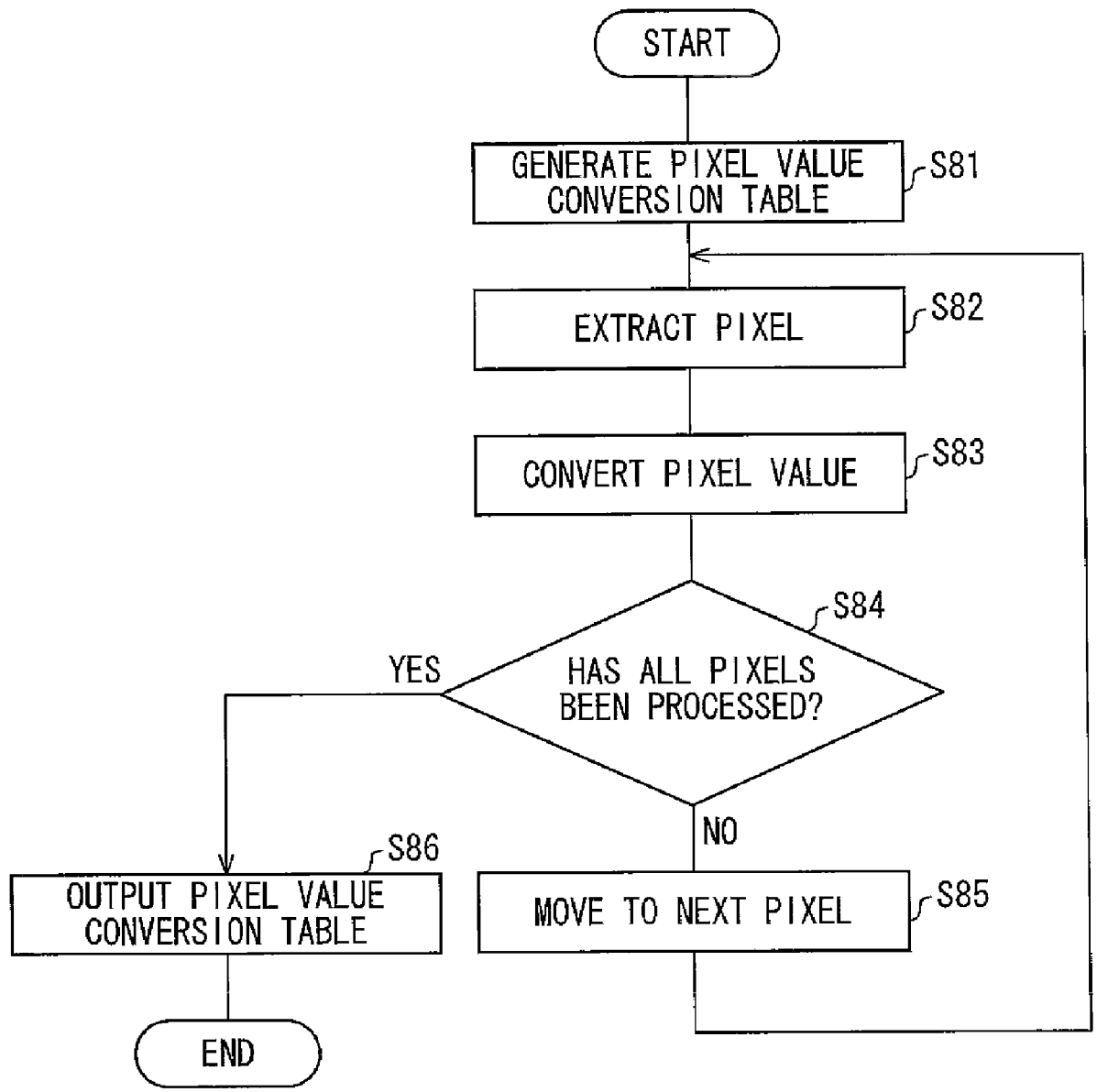
FIG. 23 is a flow chart illustrating one example of a process flow in the image data shaping section.

FIG. 23 is a flow chart illustrating one example of a process flow in the image data shaping section 36.

First, the pixel value conversion table generating section 38 generates the pixel value conversion table 39a (step S81), and stores the generated pixel value conversion table 39a in the pixel value conversion table buffer 39.

Then, the pixel value converting section 37 acquires, from an image data buffer 33, the attribute data that is reduced by the image data reducing section 34, and extracts pixel values from this attribute data (step S82). The pixel value converting section 37 converts the extracted pixel values according to the pixel value conversion table 39a that is generated by the pixel value conversion table generating section 38 (step S83).

Subsequently, the pixel value converting section 37 determines if all pixel values have been processed (step S84). If it is determined that all the pixel values have not been processed, the pixel value converting section 37 starts the processing of a next pixel value (step S85), and returns to step S82.

On the other hand, if it is determined that all the pixel values have been processed, the pixel value converting section 37 outputs contents of the pixel value conversion table 39a to an attribute data encoding section 4 (step S86), and ends a series of processing.

[Arrangement of Pixel Value Conversion Table Generating Section 38]

Figure 24:
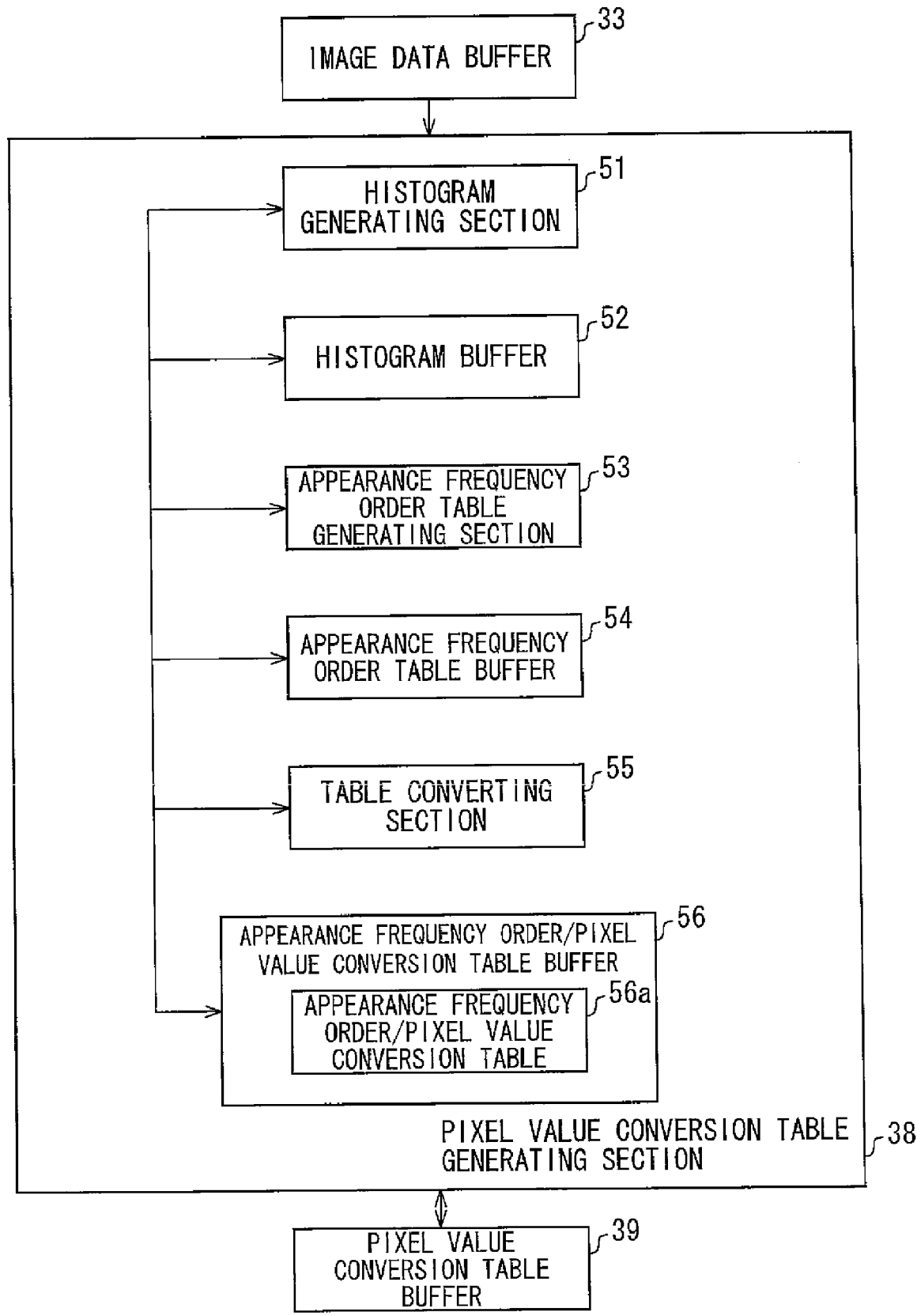
FIG. 24 is a functional block diagram illustrating an arrangement of a pixel value conversion table generating section.

FIG. 24 is a functional block diagram illustrating an arrangement of pixel value conversion table generating section 38. As illustrated in FIG. 24, the pixel value conversion table generating section 38 includes a histogram generating section 51, a histogram buffer 52, an appearance frequency order table generating section 53, an appearance frequency order table buffer 54, a table converting section 55, an appearance frequency order/pixel value conversion table buffer 56 in which an appearance frequency order/pixel value conversion table 56a is stored. Each component is communicably connected via data bus to one another and also to an external component.

The histogram generating section 51 generates a histogram showing an appearance frequency at which pixel values (attribute values) appear, from the pixel values of attribute data that is reduced and stored in the image data buffer 33 by the image data reducing section 34, and stores this histogram into the histogram buffer 52. In other words, the histogram generating section 51 produces a histogram that shows types of attributes of pixels and the number of the pixels of each type which pixels are included in the attribute data that is reduced by the image data reducing section 34.

The appearance frequency order table generating section 53 generates, from the histogram that is generated by the histogram generating section 51, an appearance frequency order table that indicates an appearance frequency order of frequency at which each pixel value appears, and stores this appearance frequency order table in the appearance frequency order table buffer 54. The appearance frequency order table is a table from which the appearance frequency order of each pixel value that is shown in the histogram stored in the histogram buffer 52 can be extracted. In other words, the appearance frequency order table is a table that indicates an appearance frequency order of each pixel value that is included in the attribute data.

The table converting section 55 generates the pixel value conversion table 39a, based on the appearance frequency order of each pixel value that is shown in the appearance frequency order table stored in the appearance frequency order table buffer 54 and a method of converting the pixel value according to the appearance frequency order which method is indicated by the appearance frequency order/pixel value conversion table 56a. Then, the table converting section 55 stores the generated pixel value conversion table 39a in the pixel value conversion table buffer 39.

In other words, the table converting section 55 generates the pixel value conversion table 39a so that each pixel value corresponds to the appearance frequency order of each pixel value in the pixel value conversion table 39a.

FIG. 25(a) illustrates one example of a histogram that is generated by the histogram generating section 51, and FIG. 25(b) schematically illustrates one example of an appearance frequency order table that is generated by the appearance frequency order table generating section 53 (the illustration is "schematic" in the meaning that because item names and contents in a left column do not exist in data that is actually stored in the histogram buffer 52 and the appearance frequency order table buffer 54).

Note that, in the example as illustrated in FIG. 25, the pixel values of the attribute data correspond to the attributes of the attribute data as illustrated in FIG. 31. Accordingly, the number of pixels showing a black character/line work (pixel value "7") is very small. Pixels showing a background (pixel value "0") appear at the highest frequency, and pixels showing a halftone dot (pixel value "3") and pixels showing a color character/line work (pixel value "4") appear at the second-highest frequency.

In this case, even if pixel values are switched as in Embodiment 1 so that the pixel value indicative of the black character/line work in a binary system become close to the pixel value indicative of the background (each bit plane becomes simple), encoding efficiency is hard to improve.

From an opposite point of view, the switching of pixel values as performed in the Embodiment 1 is performed on the assumption that each of the pixels showing the background (pixel value "0") and the pixels showing the black character/line work (pixel value "7") appear at a high frequency in the attribute data. Such an assumption does not apply in the case of the present embodiment.

Even in the case of the present embodiment, contents of each bit plane that is obtained by splitting the attribute data into bit planes become simple, by appropriately deciding a method of converting the attribute data based on contents of the attribute data, more specifically, based on a probability distribution (histogram) of the pixel values of the attribute data. This decreases entropy of each bit plane, at least in terms of probability. Therefore, this increases the encoding efficiency, and the attribute can be encoded at a high efficiency. This is a feature of the present embodiment.

The appearance frequency order/pixel value conversion table 56a is a table showing a comparative table in which an appearance frequency order of each pixel value corresponds to a desirable pixel value of the attribute data after conversion. FIG. 26 schematically illustrates one example of such an appearance frequency order/pixel value conversion table 56a. The expression in a binary system is inserted for assisting understanding and is not a part of the table. The same applies to the leftmost column and the item names.

In the example as illustrated in FIG. 26, the appearance frequency order itself is used as pixel values. However, other method is also applicable as a method of converting the pixel values. As mentioned above, each pixel value that appears at a high frequency has a binary expression similar to each other, after the pixel values are split into bit planes, and this simplifies each bit plane that is obtained by splitting the pixel values into bit planes. Therefore, this decreases entropy of each bit plane and increases encoding efficiency. That is, a data amount after encoding becomes small. This is an important purpose of the present embodiment. A method of converting the pixel value conversion table 39a in the table converting section 54 may be any conversion method as long as the method can achieve such a purpose.

[Process Flow of the Pixel Value Conversion Table Generating Section 38]

Figure 27:
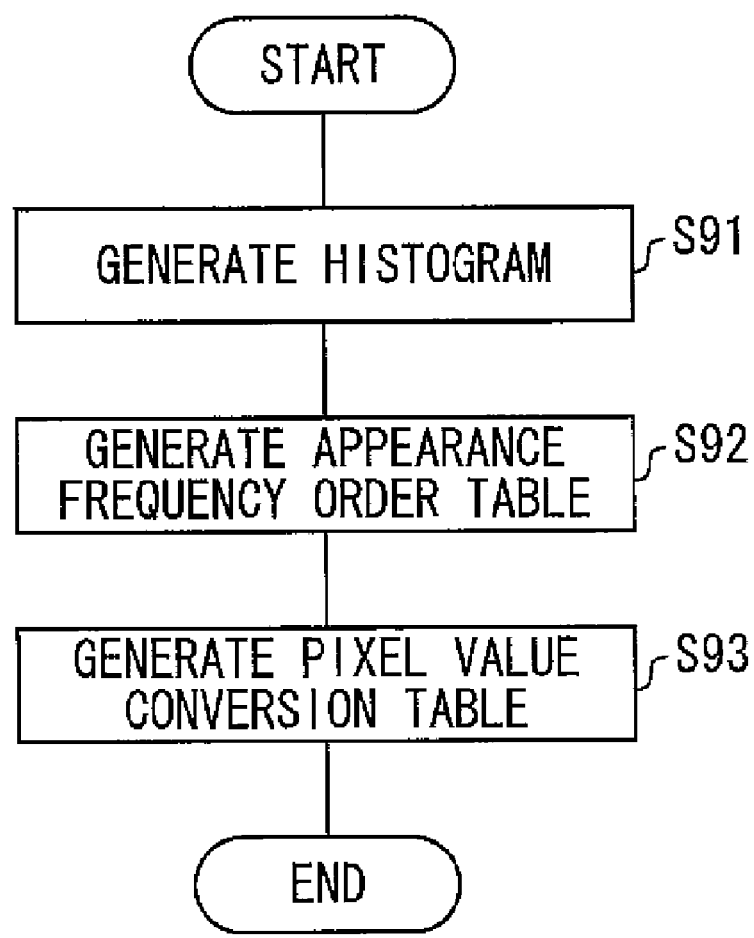
FIG. 27 is a flow chart illustrating one example of a process flow in the pixel value conversion table generating section.
Figure 29:
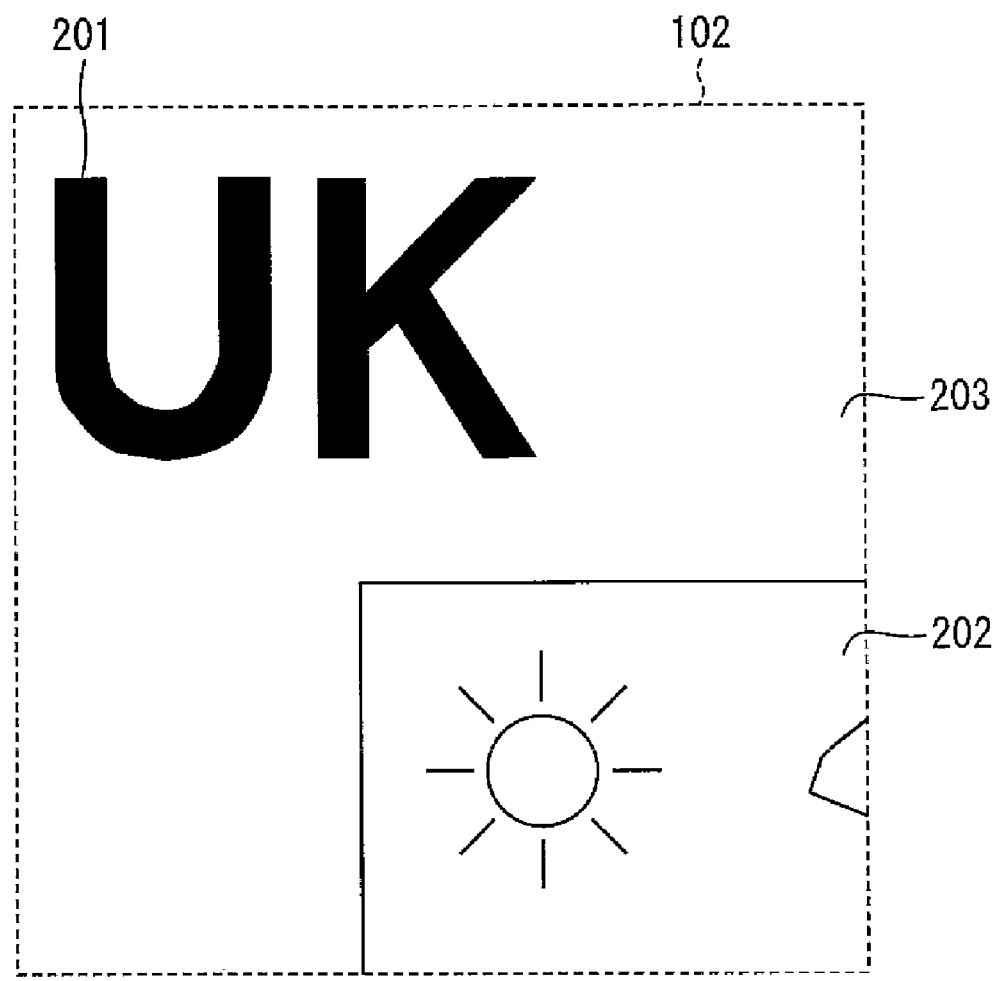
FIG. 29 is a diagram illustrating a sectional region that is a part of the input image.
Figure 30:
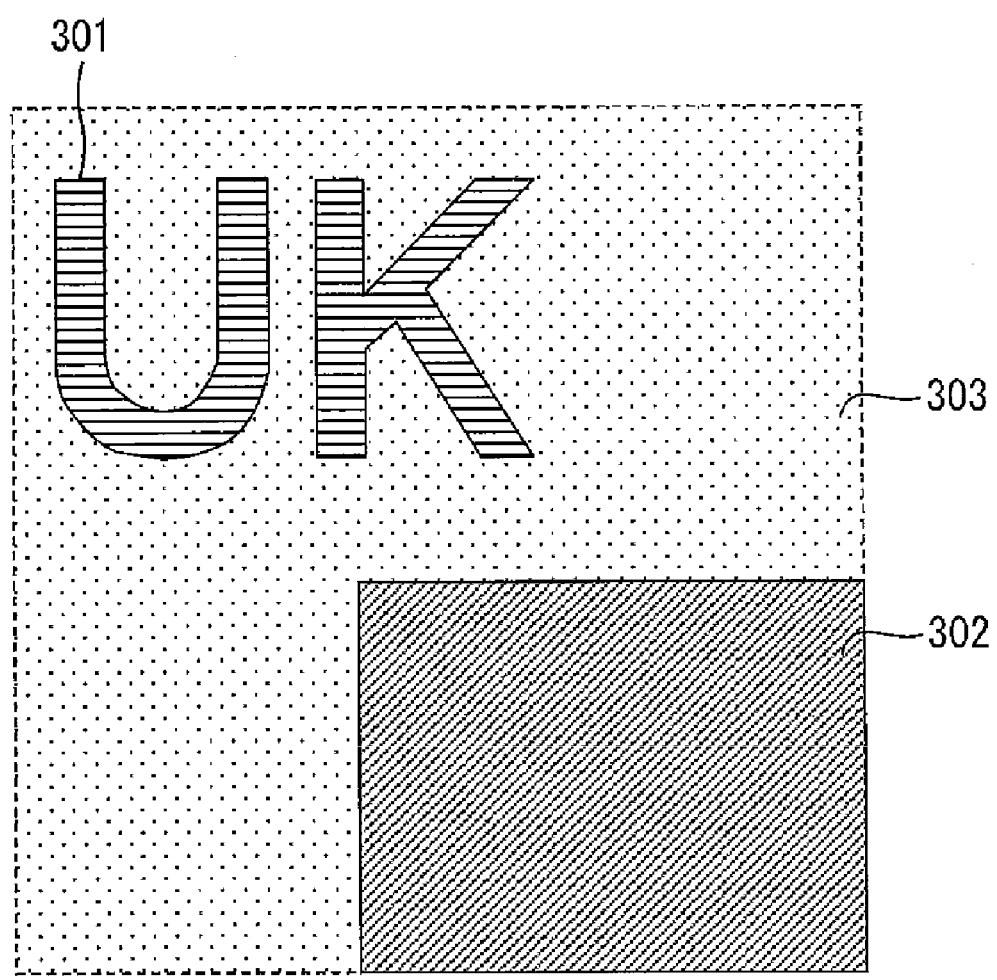
FIG. 30 is a diagram illustrating attribute data corresponding to the sectional region.

FIG. 27 is a flow chart illustrating one example of a process flow in the pixel value conversion table generating section 38.

First, the histogram generating section 51 acquires from the data buffer 33 the attribute data that is reduced by the image data reducing section 34, and generates, from this attribute data, a histogram that shows an appearance frequency of each pixel value that is included in the attribute data. Then, the histogram generating section 51 stores the generated histogram into the histogram buffer 52 (step S91).

The appearance frequency order table generating section 53 acquires, from the histogram buffer 52, the histogram that is generated by the histogram generating section 51, and generates an appearance frequency order table from this histogram. The appearance frequency order table generating section 53 stores the appearance frequency order table in the appearance frequency order table buffer 54 (step S92).

The table converting section 55 generates the pixel value conversion table 39a, based on the appearance frequency order of each pixel value extracted from the appearance frequency order table buffer 54 and the appearance frequency order/pixel value conversion table 55a, and stores thus generated pixel value conversion table 39a in the pixel value conversion table buffer 39 (step 93).

Note that the pixel value converting section 37 outputs, in step S86 (FIG. 23), the contents of the pixel value conversion table 39a to the attribute data encoding section 4. This is because addition of modification other than the explained above to the image processing device 1 of the Embodiment 1 is necessary for operating the image processing device 20 of the present embodiment effectively. The modification is such that a reverse conversion of a conversion (conversion as illustrated in the pixel value conversion table 72a) performed in the image data restoring section 72 is performed. It is easy for a person skilled in the art to modify the image processing device 1 so that the contents of the pixel value conversion table 39a is sent to the image data restoring section 72 and the reverse conversion is carried out in the image data restoring section 72, from the explanation above. Accordingly, the explanation thereof does not go into detail further.

As explained above, the image processing device 20 includes an image data acquiring section (acquisition means) 2 for acquiring an image and an image data generating section (attribute data generation means) 32 that generates the attribute data including the attribute value indicative of an attribute to which each of plurality of pixels constituting the image that is acquired by the image data acquiring section 2 belongs among predetermined attributes. In the image processing device 20, each of the attribute values is expressed as a binary numeral value and the value is split into a plurality of bit planes. The image processing device 20 further includes: a histogram generating section (appearance frequency calculation means) 51 that calculates an appearance frequency of each attribute value included in the attribute data that is generated by the image data generating section 32; and a table converting section (attribute value conversion means) 55 that converts, according to the appearance frequency of the attribute value which appearance frequency is calculated by the histogram generating section 51, the attribute value so that entropy of each bit plane becomes small or possibility that at least the entropy becomes small increases.

In other words, the table converting section 55 converts each attribute value that appears at a high frequency among the attribute values that are included in the attribute data, so that bit plane pattern of the each attribute value that appears at the high frequency becomes similar to each other.

The image processing device 20 further includes an appearance frequency order table generating section (appearance frequency order calculation means) 53 that calculates an appearance frequency order of each of the attribute values, based on the appearance frequency that is calculated by the histogram generating section 51. The table converting section 55 changes each of the attribute values according to the appearance frequency order that is calculated by the appearance frequency order table generating section 53.

The table converting section 55 uses, as an attribute value, a numeral value that is indicative of the appearance frequency order calculated by the appearance frequency order table generating section 53.

Modification Example

The present invention is not limited to the aforementioned embodiments and is susceptible of various changes within the scope of the accompanying claims. Also, an embodiment obtained by suitable combinations of technical means disclosed in the different embodiments is also included within the technical scope of the present invention.

Moreover, each block of the image processing generating devices 1 and 20 of the present invention, especially the attribute data generating sections 3 and 30 may be constituted by hardware logic or may be realized by software by using a CPU in the following manner.

That is, each of the image processing devices 1 and 20 of the present invention includes a CPU (central processing unit) that executes the order of a control program for realizing the aforesaid functions, ROM (read only memory) that stores the control program, RAM (random access memory) that develops the control program in an executable form, and a storage device (storage medium), such as memory, that stores the control program and various types of data therein. With this arrangement, the object of the present invention is realized by a predetermined storage medium. The storage medium stores, in computer-readable manner, program codes (executable code program, intermediate code program, and source program) of the control program (image processing program) of each of the image processing devices 1 and 20 of the present invention, which is software for realizing the aforesaid functions. The storage medium is provided to the image processing devices 1 and 20. With this arrangement, the image processing devices 1 and 20 (alternatively, CPU or MPU) as a computer reads out and executes program code stored in the storage medium provided.

The storage medium may be tape based, such as a magnetic tape or cassette tape; disc based, such as a magnetic disk including a Floppy® disc and hard disk and optical disk including CD-ROM, MO, MD, DVD, and CD-R; card based, such as an IC card (including a memory card) and an optical card; or a semiconductor memory, such as a mask ROM, EPROM, EEPROM, and a flash ROM.

Further, the image processing devices 1 and 20 of the present invention may be arranged so as to be connectable to a communications network so that the program code is supplied to each of the image processing devices 1 and 20 through the communications network. The communications network is not to be particularly limited. Examples of the communications network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared light, Bluetooth®, 802.11, HDR, mobile phone network, satellite connections, and terrestrial digital network. Note that the present invention can be also realized by the program codes in the form of a computer data signal embedded in a carrier wave which is embodied by electronic transmission.

In the arrangement of the example explained above, entropy of bit planes indicative of pixel values of the attribute increases in terms of possibility. However, the present invention may have an arrangement in which it is ensured by measuring entropy of bit planes after conversion of the pixel values of the attribute data and adjusting the method of converting the pixel values that the entropy after the conversion always becomes small or does not become larger at least. It is clear that this arrangement is realized by adding a slight modification to the above arrangement.

Specifically, for example, each of the image processing devices 1 and 20 may further include measurement means and modification means. The measurement means measures entropy of the bit planes indicative of pixel values of the attribute data before and after conversion of the pixel values by using the image data shaping section 35 or 36. The modification means modifies a method of converting the pixel values of the attribute data in the image data shaping section 35 or 36, when the entropy that is measured by the measurement means before and after the conversion is compared and the entropy after the conversion is larger than the entropy before the conversion.

In this case, it is not in terms of probability but ensured that the entropy becomes smaller or the entropy does not become larger due to the conversion of the pixel values.

Moreover, the measurement means may measure not the entropy but an amount of encoded data so as to ensure that the encoding efficiency becomes higher or at least the encoding efficiency does not become lower compared with encoding efficiency before the conversion. In this case, it is not in terms of probability but ensured that the encoding efficiency becomes higher or the entropy does not become smaller due to the conversion. It is clear that the method of measuring the amount of encoded data in this case should be consistent with an encoding method that is used in a bit plane encoding section 43.

Alternatively, the present invention may be expressed as follows.

That is, the image processing device of the present invention includes: image data input means via which image data is inputted; image data storage means in which the image data is stored; attribute data generation means generating attribute data based on the image data, which attribute data is indicative of an attribute of each pixel constituting the image data; attribute data storage means in which the attribute data is stored; and image data output means outputting the image data according to the attribute data stored in the attribute data storage means which image data is stored in the image data storage means, the attribute data generation means reducing the attribute data according to priority given to each pixel value.

It is preferable that the attribute data generation means includes the priority given to each pixel value in a table.

The image processing device of the present invention includes: image data input means via which image data is inputted; image data storage means in which the image data is stored; attribute data generation means generating attribute data based on the image data, which attribute data is indicative of an attribute of each pixel constituting the image data; attribute data encoding section encoding the attribute data; attribute data storage means in which the attribute data encoded is stored; and image data output means outputting the image data according to the attribute data stored in the attribute data storage means which image data is stored in the image data storage means, the attribute data generation means converting each pixel value of the attribute data so that entropy of each bit plane becomes small at least in terms of probability when the attribute data is split into bit planes, or the attribute data generation means converting the each pixel value of the attribute data so that encoding efficiency is increased at least in terms of probability when the attribute data is split into bit planes.

It is preferable that the attribute data generation means appropriately decides a method of converting the each pixel value of the attribute data as appropriate based on contents of the attribute data.

It is preferable that the attribute data generation means appropriately decide a method of converting the each pixel value of the attribute data, based on probability distribution of the each pixel value of the attribute data.

An image processing method of the present invention includes the steps of: inputting image data; storing the image data; generating attribute data based on the image data, which attribute data is indicative of an attribute of each pixel constituting the image data; storing the attribute data; and outputting the image data according to the attribute data, in the step of generating the attribute data, the attribute data being reduced according to a priority given to each pixel.

The image processing method of the present invention includes the steps of: inputting image data; storing the image data; generating attribute data based on the image data, which attribute data is indicative of an attribute of each pixel constituting the image data; encoding the attribute data; and storing the attribute data encoded; and outputting the image data according to the attribute data, each pixel value of the attribute data being converted in the step of generating the attribute data so that entropy of each bit plane becomes small at least in terms of probability when the attribute data is split into bit planes, or the each pixel value of the attribute data being converted in the step of generating the attribute data so that encoding efficiency is increased at least in terms of probability when the attribute data is split into bit planes.

A storage medium of the present invention storing a program to cause a computer to execute the steps of: inputting image data; storing the image data; generating attribute data based on the image data which attribute data is indicative of an attribute of each pixel constituting the image data; storing the attribute data; and outputting the image data according to the attribute data, in the step of generating the attribute data, the attribute data being reduced according to a priority given to each pixel value.

A storage medium of the present invention storing a program to cause a computer to execute the steps of: inputting image data; storing the image data; generating attribute data based on the image data which attribute data is indicative of an attribute of each pixel constituting the image data; encoding the attribute data; storing the attribute data encoded; and outputting the image data according to the attribute data, each pixel value of the attribute data being converted in the step of generating the attribute data so that entropy of each bit plane becomes small at least in terms of probability when the attribute data is split into bit planes, or each pixel value of the attribute data being converted in the step of generating the attribute data so that encoding efficiency is increased at least in terms of probability when the attribute data is split into bit planes.

As explained above, according to the present invention, it is preferable that the attribute data reduction means replaces attribute values of a plurality of pixels included in a predetermined region of the image with an attribute value having a highest priority among the attribute values of the plurality of pixels.

According to the arrangement, the attribute data reduction means replaces attribute values of a plurality of pixels in a predetermined region of an image indicated by the image data acquired by the acquisition means, with an attribute value having the highest priority among the attribute values of the plurality of pixels included in the predetermined region.

The predetermined region is, for example, at least one divisional region among a plurality of divisional regions produced by dividing the image indicated by the image data acquired by the acquisition means.

Therefore, the plurality of attribute values corresponding to the plurality of pixels included in the predetermined region can be replaced by one attribute value corresponding to a pixel having the highest priority. This allows reducing the attribute data while the attribute value having the highest priority reliably remains.

Moreover, it is preferable that the priority is shown in the form of a priority table indicating how each of the attribute values corresponds to a value indicative of the priority of each of the attribute values; and the attribute data reduction means determines the priority of each of the attribute values by reference to the priority table.

According to the arrangement, the attribute data reduction means determines a priority given to an attribute of a pixel according to the priority table.

Therefore, it becomes possible to easily change the priority, because the priority of the attribute of the pixel can be changed by modifying the priority table.

The image processing device of the present invention includes: acquisition means acquiring image data; attribute data generation means generating attribute data including attribute values each indicative of an attribute to which each of a plurality of pixels constituting an image indicated by the image data acquired by the acquisition means belongs among predetermined attributes; priority determination means determining a priority given to each of the attribute values, based on at least either contents of the image data or contents of the attribute data; and attribute data reduction means reducing the attribute data by converting, to one attribute value, at least two attribute values included in the attribute data generated by the attribute data generation means, according to the priority determined by the priority determination means.

According to the arrangement, the attribute data generation means generates attribute data including attribute values each indicative of an attribute to which each of a plurality of pixels constituting an image indicated by the image data acquired by the acquisition means belongs. The priority determination means decides a priority given to each of the attribute values, based on at least one contents of the image data or contents of the attribute data. The attribute data reduction means reduces the attribute data by converting, to one attribute value, at least two attribute values included in the attribute data generated by the attribute data generation means, according to the priority determined by the priority determination means.

Therefore, it becomes possible to reduce the attribute data while the attribute value having a high priority is reliably remained.

The image processing method of the present invention being an image processing method of an image processing device including acquisition means, attribute data generation means, and attribute data reduction means, the image processing method comprising the steps of: by the acquisition means, acquiring image data; by the attribute data generation means, generating attribute data including attribute values each indicative of an attribute to which each of a plurality of pixels constituting an image indicated by the image data acquired in the step of acquiring the image data belongs among predetermined attributes; and, by the attribute data reduction means, reducing the attribute data by converting, to one attribute value, at least two attribute values included in the attribute data generated in the step of generating attribute data, according to a priority given in advance to each of the attribute values.

Moreover, the technical scope of the present invention also includes an image processing program, causing the image processing device to operate, for causing a computer to function as each of the aforesaid means and a computer-readable storage medium containing the image processing program.

The present invention can be preferably applied to an image processing device utilizing attribute data, because the attribute data can be efficiently reduced while an important attribute value among attribute values included in the attribute data can be reliably remained.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing device comprising:
    an acquisition section acquiring image data;
    an attribute data generation section generating attribute data including attribute values each indicative of an attribute to which each of a plurality of pixels constituting an image indicated by the image data acquired by the acquisition section belongs among predetermined attributes; and
    an attribute data reduction section reducing the attribute data by converting, to one attribute value, at least two attribute values included in the attribute data generated by the attribute data generation section, according to a priority given to each of the attribute values.

2. The image processing device as set forth in claim 1, wherein:
    the attribute data reduction section replaces attribute values of a plurality of pixels included in a predetermined region of the image with an attribute value having a highest priority among the attribute values of the plurality of pixels.

3. The image processing device as set forth in claim 1, wherein:
    the priority is shown in a form of a priority table indicating how each of the attribute values corresponds to a value indicative of the priority of each of the attribute values; and
    the attribute data reduction section determines the priority of each of the attribute values by reference to the priority table.

4. The image processing device as set forth in claim 1, further comprising:
    a priority generation section determining the priority to be given to each of the attribute values based on at least either contents of the image data or contents of the attribute data,
    the attribute data reduction section reducing the attribute data according to the priority determined by the priority generation section.

5. An image processing method in an image processing device, comprising the steps of:
    acquiring image data;
    generating attribute data including attribute values each indicative of an attribute to which each of a plurality of pixels constituting an image indicated by the image data acquired in the step of acquiring the image data belongs among predetermined attributes; and
    reducing the attribute data by converting, to one attribute value, at least two attribute values included in the attribute data generated in the step of generating attribute data, according to a priority given to each of the attribute values, wherein the generating of the attribute data is performed in the image processing device.

6. A computer-readable storage medium containing an image processing program to cause a computer to execute the steps of:

acquiring image data;

generating attribute data including attribute values each indicative of an attribute to which each of a plurality of pixels constituting an image indicated by the image data acquired in the step of acquiring the image data belongs among predetermined attributes; and reducing the attribute data by converting, to one attribute value, at least two attribute values included in the attribute data generated in the step of generating the attribute data, according to a priority given to each of the attribute values.

* * * * *